US009191509B2

(12) United States Patent
Jones et al.

(10) Patent No.: US 9,191,509 B2
(45) Date of Patent: Nov. 17, 2015

(54) MULTI-SOURCE PROFILE COMPILATION FOR DELIVERING TARGETED CONTENT

(75) Inventors: D. Bryan Jones, Austin, TX (US); Christopher J. Duncan, Austin, TX (US); Neeraj Gupta, Austin, TX (US); William T. W. Robbins, Austin, TX (US)

(73) Assignee: Collider Media, Austin, TX (US)

( * ) Notice: Subject to any disclaimer, the term of this patent is extended or adjusted under 35 U.S.C. 154(b) by 0 days.

(21) Appl. No.: 12/617,645

(22) Filed: Nov. 12, 2009

(65) Prior Publication Data

US 2011/0111738 A1   May 12, 2011

(51) Int. Cl.
*H04M 3/42* (2006.01)
*H04M 3/00* (2006.01)
(Continued)

(52) U.S. Cl.
CPC ............. *H04M 3/4878* (2013.01); *G06Q 30/02* (2013.01); *H04M 3/4211* (2013.01)

(58) Field of Classification Search
CPC .. G06Q 30/02; H04M 3/4878; H04M 3/4211; H04M 3/42; H04M 3/00; H04L 29/06836; H04L 63/102; H04L 67/306; G06F 9/44505; G06F 17/30867; G06F 9/4451; G06F 17/30766; H04W 4/006; H04W 8/18; H04W 4/18
USPC ...................... 455/410–411, 418–420, 422.1, 455/423–425, 432.3, 433–434, 455/456.1–456.6, 514, 517, 524, 550.1, 455/552.1, 556.1–556.2, 558, 561, 566; 705/14.4–14.41, 14.47, 14.49, 14.67, 705/14.72–14.73; 379/114.13–114.14; 707/1–7, 9, 102, E17.06; 370/395.3, 370/395.52; 709/202–203, 224
See application file for complete search history.

(56) References Cited

U.S. PATENT DOCUMENTS 6,778,826 B2 * 8/2004 Rankin .......................... 455/433
6,826,574 B1 * 11/2004 Colbath ............................. 1/1
(Continued)

FOREIGN PATENT DOCUMENTS

WO    WO 2009/085471 A2    9/2009

OTHER PUBLICATIONS

Novarra, Inc., "Contextual Mobile Advertising & Analytics", Web Page, 2009, pp. 1-2, http://www.novarra.com/solutions/mobile-advertising-platform/.
(Continued)

*Primary Examiner* — Meless Zewdu
(74) *Attorney, Agent, or Firm* — Terrile, Cannatti, Chambers & Holland, LLP; Kent B. Chambers

(57) ABSTRACT

In at least one embodiment, a profile/content system generates, accesses, and/or serves a compilation profile for targeting content to identifiable communication devices ("ICDs"). The compilation profile can include data associated with a user of an ICD, and the profile/content system obtains the data from multiple data sources. The data sources can include a particular ICD and can also include particular applications running on the ICD and other data sources such as web sites and data aggregators that store data associated with the IDC user. The profile/content system can operate in a variety of modes depending upon a type of request received by the profile/content system. Exemplary modes are: (1) a direct content provision mode, (2) an indirect content provision mode, and (3) a compilation profile provision mode. In at least one embodiment, in the direct content provision mode, the profile/content system receives a request for content directly via an ICD.

18 Claims, 11 Drawing Sheets

(51) Int. Cl.
*H04M 3/487* (2006.01)
*G06Q 30/02* (2012.01)

(56) References Cited

U.S. PATENT DOCUMENTS

| | | | |
|---|---|---|---|
| 2004/0073608 A1* | 4/2004 | Bilchev | 709/203 |
| 2005/0164704 A1* | 7/2005 | Winsor | 455/432.3 |
| 2006/0195441 A1* | 8/2006 | Julia et al. | 707/5 |
| 2007/0130244 A1* | 6/2007 | Swanburg et al. | 709/200 |
| 2007/0179841 A1* | 8/2007 | Agassi et al. | 705/14 |
| 2008/0034088 A1 | 2/2008 | Suresh | |
| 2008/0109422 A1* | 5/2008 | Dedhia | 707/5 |
| 2009/0049469 A1 | 2/2009 | Small et al. | |
| 2009/0083032 A1 | 3/2009 | Jablokov et al. | |
| 2009/0113319 A1* | 4/2009 | Dawson et al. | 715/762 |
| 2009/0132395 A1* | 5/2009 | Lam et al. | 705/30 |
| 2009/0138593 A1* | 5/2009 | Kalavade | 709/224 |
| 2009/0144159 A1 | 6/2009 | Bashyam | |
| 2009/0164452 A1* | 6/2009 | Yogaratnam et al. | 707/5 |
| 2009/0187593 A1* | 7/2009 | Chen et al. | 707/104.1 |
| 2009/0197582 A1 | 8/2009 | Lewis et al. | |
| 2009/0198579 A1 | 8/2009 | Lewis et al. | |
| 2009/0199107 A1 | 8/2009 | Lewis et al. | |

OTHER PUBLICATIONS

Novarra, Inc., "Internet Mobility", Web Page, 2009, pp. 1-4, http://www.novarra.com/wp-content/uploads/novarrasolutionoverview-web.pdf.

* cited by examiner

MULTI-SOURCE PROFILE COMPILATION FOR DELIVERING TARGETED CONTENT

BACKGROUND OF THE INVENTION

1. Field of the Invention

The present invention relates in general to the field of information processing, and more specifically to a system and method related to multi-source compilation profiles for targeted content sourcing.

2. Description of the Related Art

Use of mobile communication devices ("MCDs"), such as mobile telephones, is wide spread. Many data providers provide content to MCDs that is not specifically selected by users of the MCDs. A user can actively select content by intentionally activating a request for content. An MCD or an application executing on the MCD can also request content without the user's active participation. Content that is not actively requested by a user is referred to herein as "unsolicited content". When providing unsolicited content, data content providers prefer targeting users of MCDs who are interested in the content provided. More effective targeting generally enhances the value of the content. For example, advertisements represent a type of unsolicited content, and advertisers prefer targeting users interested in purchasing their products. In turn, advertisers compensate advertisement publishers for placement of advertisements, and generally compensate more for placement of advertisements that create the higher economic return.

Personal computer web browser applications, such as Microsoft Corporation's Internet Explorer and the Mozilla Foundation's Firefox, can store certain information about a user including information that can be used to determine a user's actual or inferred interests. Such user information can be stored on a personal computer as data referred to as a "cookie". Cookies can be accessed by server-side applications and can be utilized to better target advertising to a user.

However, data content providers providing unsolicited content have been less effective in targeting users of MCDs. Many MCDs execute one or more applications. An iPhone™ is a popular type of MCD that supports many native applications including a web browser. iPhones are available from Apple Computer of Cupertino, Calif., USA. Applications allow the MCDs to exchange data with a variety of remote server applications. The data transmitted by the MCD represents actions taken by a user (referred to as "action data") and contextual data. Contextual data is data transmitted by the MCD that accompanies the action data and can provide some context about the action data. This contextual data does not provide data about the user of the MCD. For example, some MCDs can provide a time of connection, such as a timestamp, between a mobile application and a server as well as the location of the MCD. The time and location represent contextual data. Although the web browser application on an MCD may store a cookie, many other applications on the same MCD currently do not store or share cookies that could provide data useful in targeting unsolicited content to the user of the MCD.

Accordingly, some advertisers providing advertisements to an MCD user focus on contextual advertising and behavioral advertising. Contextual advertising involves using real-time contextual data to select a particular advertisement to send to an MCD. Such advertisements are believed to attract users because they share a similar context as this then-current active data provided by the MCD. For example, sending data from the MCD that a location could return an advertisement for an establishment in proximity to the location.

Behavioral advertising is based on a collection of action data (referred to as "clickstream data") taken by an MCD user and transmitted by the MCD. The clickstream data is used to gauge the user's interest in a particular advertisement. For example, if the MCD transmits data accessing multiple automotive sites, an advertiser could send the MCD an advertisement from a car dealer.

User's can provide user registration data to a system when a user registers with the system. For example, during registration, a user may provide the user's name, an age range, or other information about the user.

Thus, an advertising system can collects registration data of an MCD user and actively monitor a user's actions and accompanying contextual data as transmitted by the MCD of the user. The collected data is used by the advertising system to target advertisements to an MCD user.

SUMMARY OF THE INVENTION

In one embodiment of the present invention, a method includes performing with a computer system receiving data that associates a user with a mobile communications device. The method also includes performing with the computer system receiving data directed to the computer system from multiple data sources. The data received is associated with the user, the data received includes passive data, and the passive data includes data about the user received from two or more of the multiple data sources. The method further includes performing with the computer system storing the passive data about the user in a data structure in a tangible, computer-readable medium. The data structure is configured for at least identifying the passive data about the user and for at least generating a compilation profile that includes the passive data about the user. The method also includes performing with the computer system generating a compilation profile of the user using the passive data.

In another embodiment of the present invention, a method includes performing with a computer system providing a compilation profile of a user of a mobile communications device to a data processing system coupled to the computer system. The compilation profile is generated using data directed to the computer system from multiple data sources, the data is associated with the user, the data includes passive data, and the passive data includes data about the user received from two or more of the multiple data sources.

In a further embodiment of the invention, a method includes performing with a computer system providing targeted content for serving to a mobile communications device. The targeted content is obtained using a compilation profile of a user associated with the mobile communications device. The compilation profile is generated using data directed to the computer system from multiple data sources. The data is associated with the user. The data includes passive data, and the passive data includes data about the user received from two or more of the multiple data sources. The passive data about the user is stored in a data structure configured for at least identifying the passive data about the user and for at least generating a compilation profile that includes the passive data about the user.

BRIEF DESCRIPTION OF THE DRAWINGS

A particular embodiment of the present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
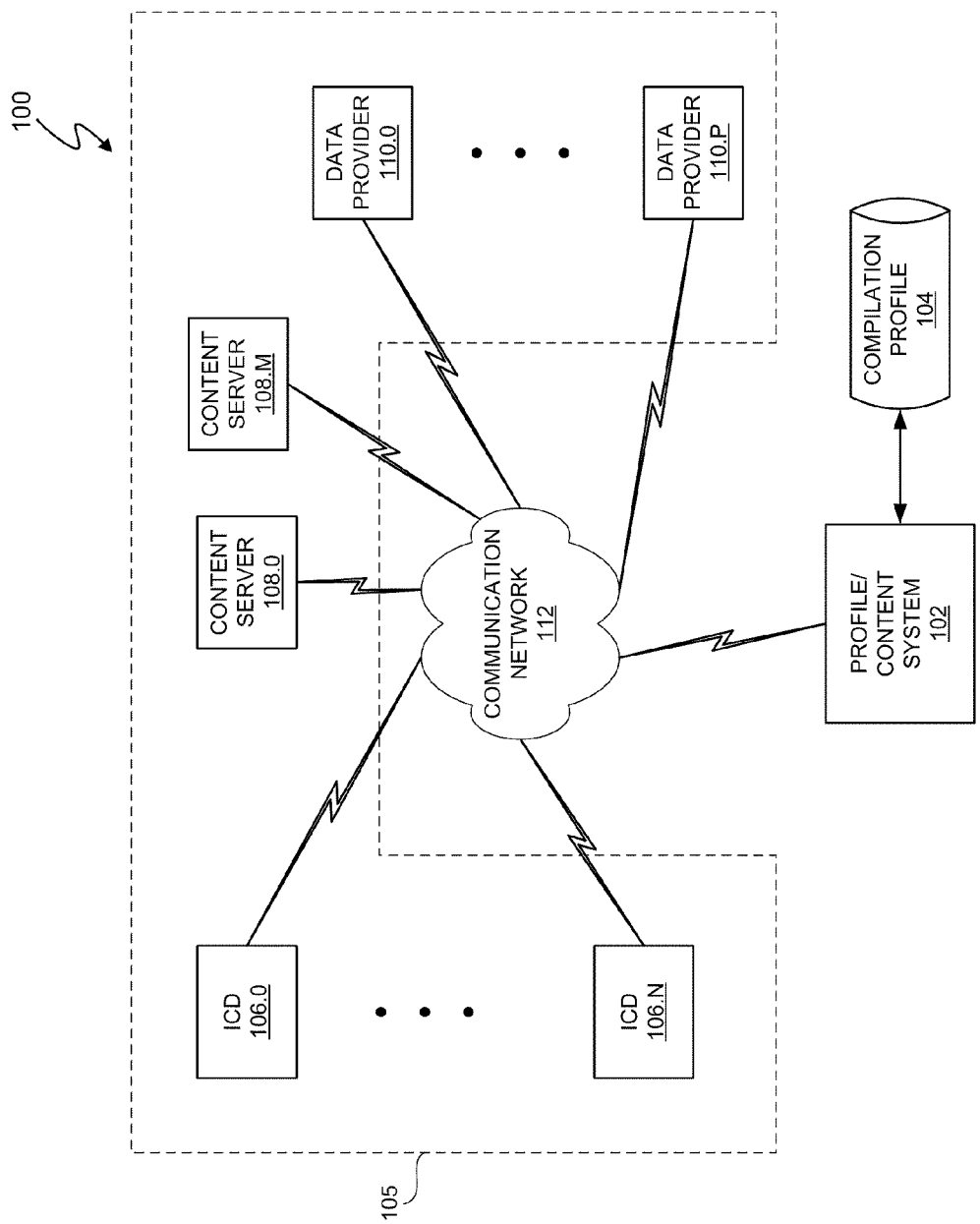
FIG. 1 depicts an exemplary network that facilitates generation and utilization of a compilation profile.

In at least one embodiment, a profile/content system generates, accesses, and/or serves a compilation profile. In at least one embodiment, the compilation profile facilitates providing targeting content to one or more identifiable communication devices ("ICDs"). The profile/content system generates the compilation profile using data, including passive data, that is directed to the profile/content system from multiple data sources. In at least one embodiment, the passive data includes data about a user. In at least one embodiment, the passive data about the user is stored in a data structure in a computer-readable medium. In at least one embodiment, the data structure is configured for at least identifying the passive data about the user and for at least generating a compilation profile that includes the passive data about the user. In at least one embodiment, to generate the compilation profile, the profile/content system accesses the data, including the passive data about the user stored in accordance with the data structure, and transforms the data, including the passive data, into a compilation profile.

In at least one embodiment, the compilation profile includes data associated with a user of an ICD, and the profile/content system obtains the data from multiple data sources. In at least one embodiment, a data source is a combination of both where the data originates and for which ICD user that data is associated. In at least one embodiment, the data source is not conceptually limited to a particular, physical transmitter of data. For example, a data source is not limited simply to a particular ICD. The data sources can include a particular ICD, can also include particular applications running on the ICD, as well as other data sources such as web sites, social networks, and data aggregators that store data associated with the ICD user.

In at least one embodiment, the data obtained from the multiple sources can be classified as passive data and real-time active data. In at least one embodiment, the data sources and utilized by the profile/content system to generate a compilation profile includes passive data. In at least one embodiment, the passive data includes data about the user received from two or more of the multiple data sources. In at least one embodiment, the passive data includes data related to one or more data communication sessions of the ICD user with at least two of the multiple data sources. In at least one embodiment, passive data about a user includes data that provides insight about a user. Passive data can also include data that is not required to be sent to a content server in order to elicit a response from the content server. For example, in at least one embodiment, passive data includes demographic information of the ICD user, location of the ICD, name of the ICD user, identification of one or more particular applications used by the user to provide data, preferences of the user, configuration choices of an application accepted by the user, and so on.

Real-time active data represents real-time content requests that elicit a response from a content server or data source. In at least one embodiment, active data is used by a content server to respond to the content request. Passive data and active data can be transmitted by an ICD or other device together in a single data communication session. For example, in at least one embodiment, a data communication session includes a specific request for content and also includes data that is not required to respond to the current content request, such as location information of the ICD or demographic information of the ICD user. In at least one embodiment, passive data includes historical active data, i.e. not real-time data provided in the current content request. In at least one embodiment, passive data and real-time active data are mutually exclusive. In at least one embodiment, at least a portion of the passive data is historical data and, thus, is not associated with a real-time content request. Active data can be also transmitted by an ICD or other device without passive data.

In at least one embodiment, the compilation profile facilitates providing targeted content. In at least one embodiment, the profile/content system operates in a variety of modes depending upon a type of request received by the profile/content system. Exemplary modes are: (1) a direct content provision mode, (2) an indirect content provision mode, and (3) a compilation profile provision mode. In at least one embodiment, in the direct content provision mode, the profile/content system receives a request for content directly via an ICD. In response, the profile/content system utilizes the compilation profile to provide targeted content to a user via one or more ICDs. For example, in at least one embodiment, the profile/content system retrieves data, including passive data about the user, from a computer-readable medium. The profile/content system generates a compilation profile that includes the passive data about the user. The profile/content system obtains targeted content to be sent to an ICD, including an MCD, of the user based upon the particular passive data about the user in the generated compilation profile. In at least one embodiment, the targeted content can be provided to a requesting ICD and/or one or more other ICDs associated with a user of the requesting ICD. In at least one embodiment, one or more applications executing on an ICD includes a content call routine. The content call routine of an application executing on an ICD represents a requestor that requests content for presentation by the ICD. The profile/content system responds by providing targeted content based at least in part on a compilation profile. In at least one embodiment, in the indirect content provision mode, the profile/content system receives a request for content from a content server. In response, the profile/content system utilizes the compilation profile to provide targeted content to the content server to allow the content server to serve the targeted content.

In at least one embodiment, the targeted content can be any content suitable for providing to an ICD. The targeted content can be obtained in any of a variety of ways, In at least one embodiment, the targeted content is obtained by selecting content from available content, such as an advertisement or link to an advertisement for a specific product or store, that exists prior to receipt of a content request. The targeted content can also be obtained by dynamically generating the targeted content. In at least one embodiment, the targeted content is generated in response to a request, and, in at least one embodiment, customized based on a compilation profile for the user of the ICD. For example, if an ICD user is male, the background of the targeted content could be blue, and, if the ICD user is female, the background of the targeted content could be red. In at least one embodiment, the targeted content is obtained by combining selected, existing content and dynamically generated content. The profile/content system can also utilize information in addition to the compilation profile to generate targeted content. For example, real-time contextual data can also be used to select and/or generate targeted content. For example, if the profile/content system determines that the ICD user is a female in a specific city and the current weather is at the location of the ICD user is getting colder, the profile/content system could serve a coupon for a ladies' coat at a particular, nearby store. Data transmitted by the ICD represents actions taken by the IDC user (referred to as "action data") and contextual data. Contextual data is data transmitted by the ICD that accompanies the action data and can provide some context about the action data. For example, an internet protocol television (IPTV) represents one embodiment of an ICD. An IPTV can provide contextual data such as IPTV packages and videos ordered, IPTV channels watched and timestamps, IPTV programs recorded, ecommerce purchases on the Internet, Internet surfing history. This contextual data does not provide information about the user of the MCD. For example, contextual data does not provide personal attributes of the user, such as the user's name, age, address, birthday, gender, marital status, etc.

In at least one embodiment, in the compilation profile provision mode, the profile/content system provides at least a subset of the compilation profile to a requestor to allow the requestor to, for example, provide targeted content to serve to an ICD.

In general, an ICD represents a communication device that can receive data and that has a specific identifier to which specific data can be sent. A mobile communication device ("MCD") including mobile phones represents one embodiment of an ICD. Mobile phones include all mobile phones that can present content to a user, including smartphones such as the Apple iPhone™, a Google Android™, and a Research in Motion Blackberry™. Other exemplary ICDs include, Internet Protocol televisions ("IPTVs"), ultra-mobile personal computers ("UMPCs"), digital video recorders, gaming devices, and other communication devices that have unique addresses for purposes of receiving data communication.

FIG. 1 depicts an exemplary network 100 that facilitates generation and utilization of a compilation profile. The network 100 includes a profile/content system 102. The particular topology and implementation of profile/content system 100 is a matter of design choice. The profile/content system 102 generates compilation profiles 104 that can be used for a variety of purposes including providing targeted content for one or more of the ICDs 106.0 through 106.N and one or more content servers 108.0-108.M. N is an integer index greater than or equal to 0, and, thus, the number of ICDs ranges from 1 to N+1. In at least one embodiment, N represents the number of ICDs connected to the Internet and available to receive targeted content from content servers 108.0 through 108.M M is an integer index greater than or equal to 0, and, thus, the number of content servers 108.0-108.M ranges from 1 to M+1. M+1 is the number of content servers 108.0-108.M that request data from profile/content system 102. In at least one embodiment, content servers 108.0-108.M are web servers that provide targeted content to one or more of the ICDs 106.0-106.N. Targeted content includes content that is directed to a particular ICD 106.X. The index notation "X" indicates an individual $X^{th}$ element. For example, ICD 106.X represents an one of the N+1 ICDs 106.0-106.N. Targeted content includes any content that may be of interest to a user of ICD 106.X. For example, targeted content can include one or more advertisements, weather data, sports scores, electronic coupons, etc. In at least one embodiment, targeted content includes any unsolicited content that is targeted to the user of ICD 106.X. In at least one embodiment, targeted content includes content that is responsive to CONTENT REQUEST that indicates a particular type of content. For example, the CONTENT REQUEST may indicate a request for an advertisement, weather data, sports scores, electronic coupons, etc. Data sources 105 collectively represent sources of data such as ICDs 106.0-106.N, content servers 108.0-108.M, and data providers 110.0-110.P. P is an integer index greater than or equal to 0.

Users of ICDs 106.0-106.N engage in data communication sessions with data sources 105, such as one or more applications 204.X (FIG. 2) and/or one or more of the content servers 108.0-108.M and data providers 110.0-110.P. A data communication session represents an event when a user of an ICD 106.X or any other device associated with the user provides data to one or more applications 204.X (FIG. 2), and/or one or more of the content servers 108.0-108.M and data providers 110.0-110.P. In at least one embodiment, a data communication session is also bidirectional and is an exchange of data between a user and a data source 105. For example, a web session in which data is exchanged between an Internet browser and a data provider 110.X implemented as a web server represents one embodiment of a data communication session. A content request, such as an advertisement request, by an application executing on an ICD 106.X also represents an exemplary data communication session. An interaction of a user of an ICD 106.X with an application 204.X (FIG. 2) represents an exemplary data communication session.

The profile/content system 102 generates compilation profiles 104 using data from multiple ones of data sources 105. Data sources are separate from profile/content system 102. Data providers 110.0-110.P include any source of data about at least some of the users associated with ICDs 106.0-106.N. In at least one embodiment, a user is associated with an ICD 106.X if communication service for ICD.X is registered in the name of the user or on behalf of the user. For example, if ICD.X is an MCD and AT&T has registered service to the MCD in the name of Jane Doe, then Jane Doe is the user associated with the MCD. The user can also be associated with two or more ICDs 106.0-106.N, and more than one user can be associated with the same ICD.X. For example, a user can be associated with one or more MCDs, IPTVs, UMPCs, digital video recorders, gaming devices, and other communication devices that have addresses for purposes of receiving data communication. Note that the address does not need to be permanent. In at least one embodiment, the address is unique for only a then-current specific communication session. The data providers 110.0-110.P represent any data source that can provide data useful to profile/content system 102 in generating the compilation profiles 104. In at least one embodiment, a subset of the data providers 110.0-110.P are data aggregators that collect data from other ones of data sources 110.0-110.P. Thus, in one embodiment, profile/content system 102 receives data from data sources 110.0-110.P, wherein P≥1, but ICD.X engages in a communication session with a smaller subset of data sources 110.0-110.P. For example, in at least one embodiment, profile/content system 102 receives data from 3 data sources 110.0-110.2, and ICD.X only engages in a communication session with data sources 110.0-110.1. In at least one embodiment, data source 110.2 is a data source, such as a data aggregator, that collects data associated with the user of ICD.X but does not engage in a communication session with ICD.X. An exemplary data aggregator is Acxiom Corporation with offices in Little Rock, Ark.

In at least one embodiment, a data source is a combination of where the data originates and for which ICD user that data is associated. For example, an application executing on ICD 106.0 may request an advertisement placement for a display of the ICD. The ICD 106.0 transmits the request to content server 108.0. Although, ICD 106.0 actually transmits the request, the requesting application is where the data originates and the ICD 106.0 is associated with a specific user. So, in this embodiment, one data source is the requesting application of the user executing on ICD 106.0. Table 1-Table 4 provide an exemplary, nonexclusive list of data sources 105 identified by type:

TABLE 1

ICD

| MCD |
| Computer |
| Netbook |
| UMPC |
| IPTV set top box |
| DVR |
| Gaming Device |
| IPTV |

TABLE 2

SOFT

| Mobile Applications |
| Web Browser |
| Websites |
| Operating Systems |
| Cookies |
| Computer Applications |
| VoIP Applications |

TABLE 3

THIRD PARTY DIRECT

| Facebook Connect |
| Twitter |
| MySpace |
| OAuth |
| Wireless Carriers |

TABLE 4

THIRD PARTY INDIRECT

| Data Aggregators |
| Device Manufactures |
| Wireless Carriers |
| Cable Operators |

The ICD data types are different ICDs 106.0-106.N. In at least one embodiment, one or more of the ICDs 106.0-106.N in Table 1 are associated with a particular user.

The SOFT data types are software applications or software data or text, such as a cookie, stored by an application. The software applications can be executed by ICDs 106.0-106.N, content servers 108.0-108.M, and/or data providers 110.0-110.P. THIRD PARTY DIRECT data sources refer to third party data sources that obtain at least passive data about a user directly from the user. THIRD PARTY INDIRECT data sources refer to third party data sources that obtain at least passive data about a user indirectly from one or more other data sources.

In addition to obtaining data directly associated with a user, profile/content system 102 can also obtain data associated with others that provides insight about the user. For example, if user A has two friends, user B and user C, that have similar profiles. If users B and C receive content that produces a positive reaction, then the association of user A with users B and C increases the probability that user A will have a positive reaction to the same content.

In at least one embodiment, the profile/content system 102 includes compilation profiles (not shown) that facilitate providing content to, for example, ICDs 106.0-106.N and content servers 108.0-108.M. In at least one embodiment, the profile/content system 102 operates in a variety of modes depending upon a type of request received by the profile/content system. Exemplary modes are: (1) a direct content provision mode, (2) an indirect content provision mode, and (3) a compilation profile provision mode. In at least one embodiment, in the direct content provision mode, the profile/content system 102 receives a request for content directly via an ICD 106.X. In response, the profile/content system 100 utilizes the compilation profile to provide targeted content to a user via one or more ICDs. In at least one embodiment, in the indirect content provision mode, the profile/content system 102 receives a request for targeted content from a content server 108.X. In response, the profile/content system 102 utilizes the compilation profile to provide targeted content to the content server 102 to allow the content server to serve the content.

In at least one embodiment, the targeted content can be any content suitable for providing to an ICD 106.X. The profile/content system 102 obtains the targeted content in any of a variety of ways. In at least one embodiment, the targeted content is obtained by selecting from content, such an advertisement or link to an advertisement for a specific product or store, that exists prior to receipt of a content request. The targeted content can also be obtained the dynamic generation of content by profile/content system 102 in response to a request, and, in at least one embodiment, customized for a user of the ICD 106.X. In at least one embodiment, the targeted content is a combination of selected, existing content and dynamically generated content. The profile/content system 102 can also utilize information in addition to the compilation profile to generated targeted content.

In at least one embodiment, in the compilation profile provision mode, the profile/content system 102 provides at least a subset of the compilation profile to a requestor such as contents server 108.X to allow the requestor to, for example, provide targeted content to serve.

In at least one embodiment, communication network 112 facilitates actual communication between ICDs 106.0-106.N, content servers 108.0-108.M, data providers 110.0-110.P, and profile/content system 102. In at least one embodiment, the communication network 112 includes a cellular network communication system, a medium (such as air) for point-to-point wireless communications such as Bluetooth™ communications or wired communications, and the Internet.

Figure 2:
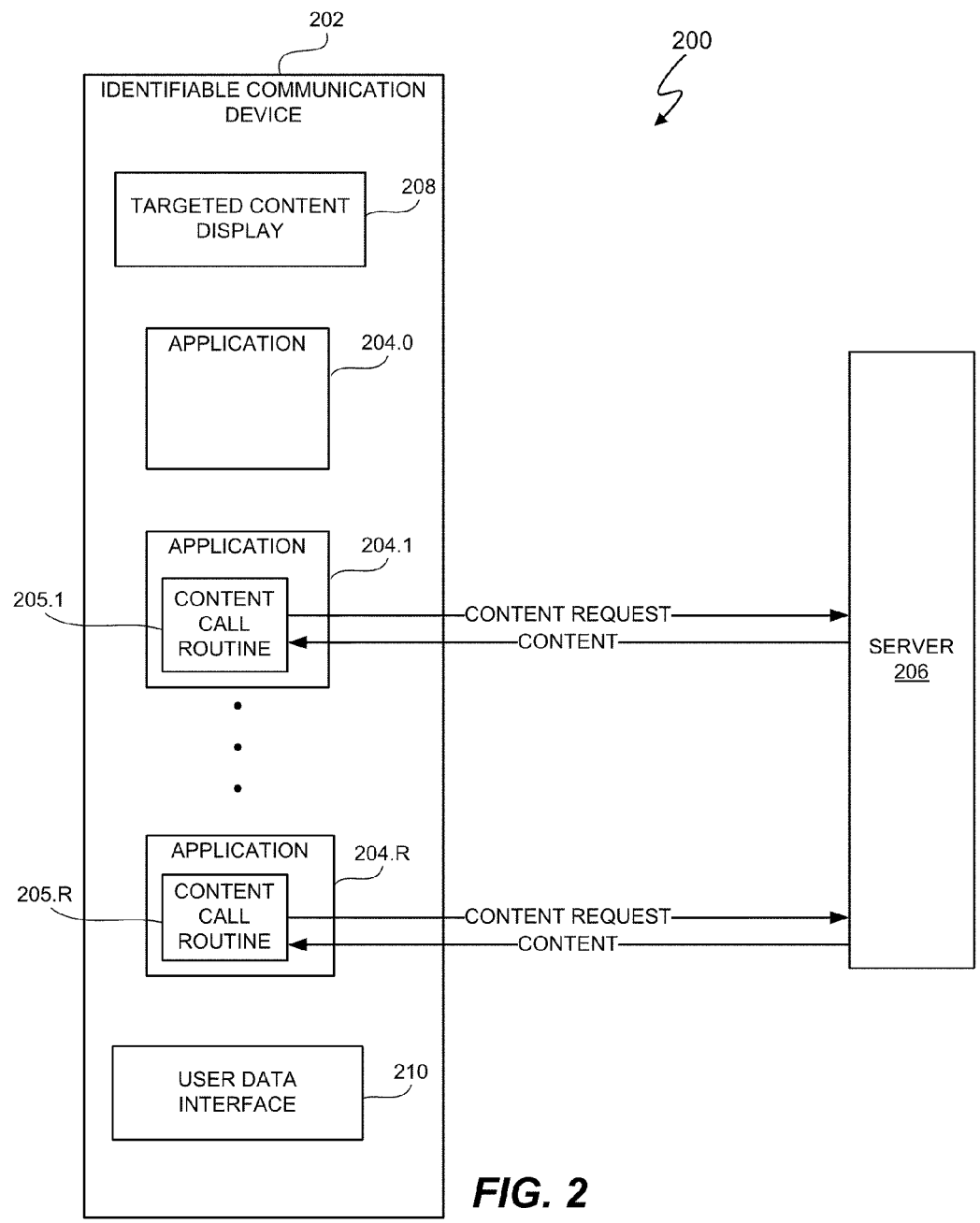
FIG. 2 depicts an exemplary communication system.

FIG. 2 depicts communication system 200. Communication system 200 represents an exemplary, subset of network 100. Communication system 200 includes an MCD 202.

MCD 202 represents one embodiment of ICD 106.X. The MCD 202 can be any MCD, such as an iPhone™. The MCD 202 includes R+1 native applications 204.0-204.R, where R is an integer greater than or equal to one. Some or all of the native applications 204.0-204.R of the mobile communications device 202 include a content call routine, such as an advertisement call routine, or can access an content call routine. In the embodiment of FIG. 1, applications 204.1-204.R include content call routines 205.1-205.R. The content call routines 205.1-205.R issue a CONTENT REQUEST and, in at least one embodiment, place advertisements on a display 208 of the MCD 202. The CONTENT REQUEST, such as an advertisement, includes then-current active data sent to server 206. The CONTENT REQUEST can also include passive data. In at least one embodiment, server 206 represents content servers 108.X. In at least one embodiment, server 206 represents one embodiment of profile/content system 102. The server 206 responds to the CONTENT REQUEST by providing the requested CONTENT. The CONTENT can take any form including actual code for displaying content or data or a link, such as a uniform resource locator (URL), that identifies content for placement in the display 208. The application 204.X requesting the CONTENT or another system in MCD 202 places the content for rendering on the display 208 of the MCD 202. A user of MCD 202 can input data to interact with, for example, an application 204.X by entering data via user data interface 210. In at least one embodiment, the user data interface 210 is a set of keys representing alpha-numeric characters. In at least one embodiment, the user data interface 210 is a touch-screen display to allow a user to select alpha-numeric characters. In at least one embodiment, the user data interface 210 responds to audio input, such as voice commands.

Figure 3:
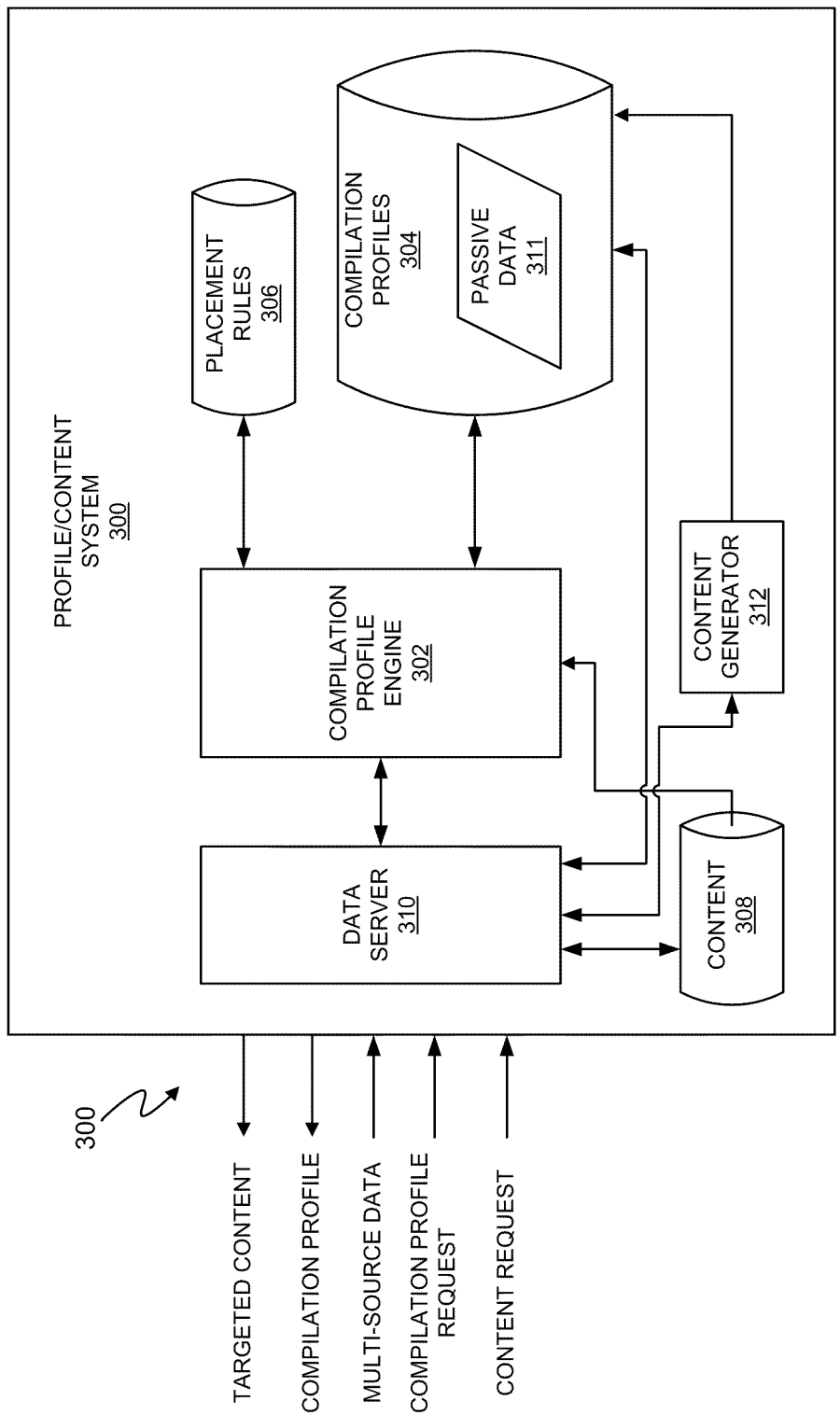
FIG. 3 depicts an exemplary profile/content system.

FIG. 3 depicts profile/content system 300. Profile/content system 300 represents one embodiment of profile/content system 102. Profile/content system 300 includes a compilation profile engine 302 that generates and retrieves compilation profiles 304. Compilation profiles 304 represent one embodiment of compilation profiles 104. In at least one embodiment, the compilation profiles 304 are stored and retrieved from a computer-readable medium. The computer-readable medium includes tangible computer-readable mediums such as a hard disk drive, flash-type memory, optical storage media, such as compact disks and digital versatile disks. Referring to FIGS. 1 and 3, in general, the compilation profiles 304 include data associated with one or more users of one or more ICDs, such as ICDs 106.0-106.N. Data can also include data about one or more individuals associated with the user such as individuals in the user's social graph. In at least one embodiment, a "social graph" is a global mapping of individuals and how the individuals are connected to each other. For example, with access to a user's Facebook profile, the profile/content system 300 can access obtain information about "friends" of the user via Facebook Connect. Similarly, with access to a user's Twitter account, profile/content system 300 can identify followers of the user. "Facebook" is a company having offices in Palo Alto, Calif., USA. "Twitter" is a company having offices in San Francisco, Calif., USA. The compilation profiles 304 include passive data 306 associated with one or more ICD users. In at least one embodiment, a plurality of the ICD users are associated with at least one of the compilation profiles 304. In at least one embodiment, a compilation profile 304.X is uniquely associated with a single ICD user. "Compilation profile 304.X" represents one of the compilation profiles 304.

In at least one embodiment, for each ICD user associated with one or more of the compilation profiles 304, the data in the ICD user's compilation profile 304.X includes passive data 311. The passive data 311 includes data associated with one or more data communication sessions of the ICD 106.X user with one or more of the data sources 105 in network 100. In at least one embodiment, at least one of the data sources in data sources 105 has data associated with the ICD 106.X user but does not engage in a communication session with the ICD 106.X user. For example, in at least one embodiment, a data aggregator collects data associated with the ICD 106.X user but does not engage in a direct communication system the ICD 106.X user. The passive data 311 can also include data associated with other individuals that are associated with the ICD user. As previously mentioned, a data source in network 100 can include one or more of data providers 110.0-110.P as well as one or more of the ICDs 106.0-106.N, and one or more of the content sources 108.0-108.M. In at least one embodiment, passive data 306 represents data that provides insight about a user of an ICD 106.X. In at least one embodiment, passive data 304 is data that is not required to be sent to a content server in order to elicit a response from the content server. Passive data 304 can include real-time data and historical data. For example, in at least one embodiment, passive data 304 includes demographic information of the ICD user, location of the ICD, name of the ICD user, an historical request for advertising originating from a first application of the ICD, a request for advertising originating from a second application of the ICD, advertising preference information directly provided by the user of the ICD to a content server 108.X such as an advertising server system, identification of a mobile application of the ICD, and information inferred by analyzing any of the other passive or active data. Active data 306 includes only real-time data.

As subsequently described in more detail, profile/content system 300 also includes data server 310, which responds to COMPILATION PROFILE REQUESTS and CONTENT REQUESTS. In at least one embodiment, the profile/content system 300 utilizes compilation profiles to allow the data server 310 to respond to CONTENT REQUESTS. In at least one embodiment, requestors for content include ICDs 106.0-106.N, applications executing on ICDs 106.0-106.M, and content servers 108.0-108.M. In at least one embodiment, data server 310 provides content by selecting stored, preexisting content 308 and/or providing content generated by content generator 312.

Figure 4:
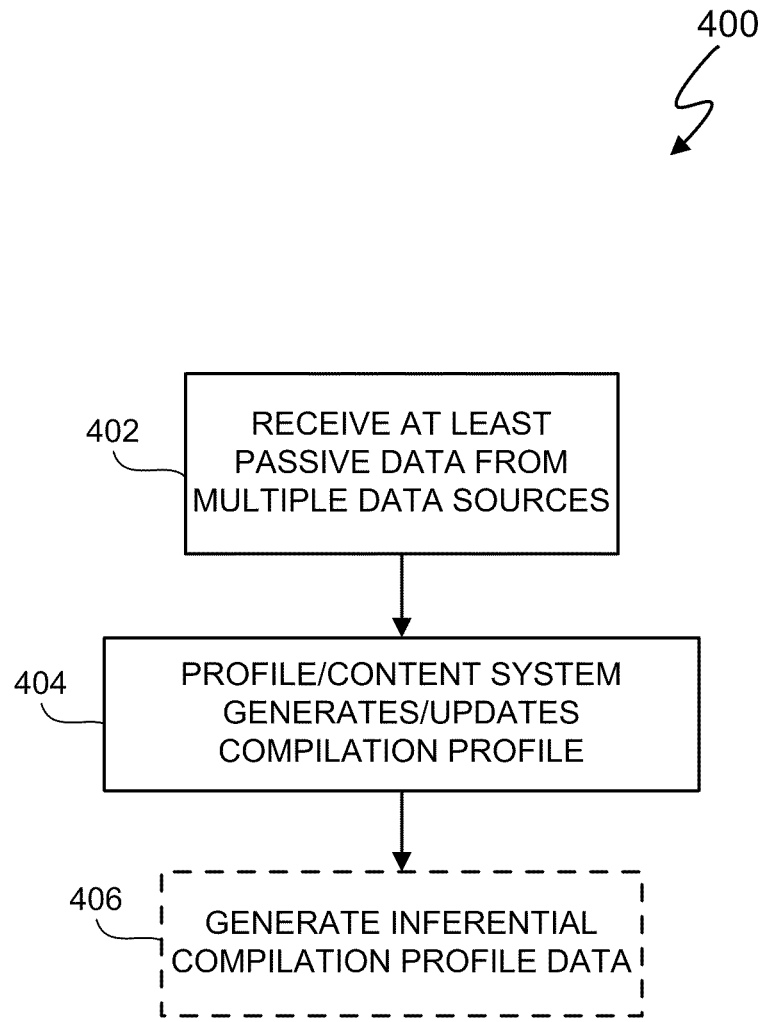
FIG. 4 depicts an exemplary compilation profile generation process.

FIG. 4 depicts an exemplary compilation profile generation process 400. In at least one embodiment, the compilation profile generation process 400 is implemented in code, stored in a data storage device (not shown), and executable by a processor (not shown) of the profile/content system 300.

Referring to FIGS. 3 and 4, in operation 402, profile/content system 300 receives at least passive data from a plurality of the data sources 105 including one or more of data providers 110.0-110.P and one or more applications executing on ICDs 106.0-106.N. In at least one embodiment, the data received by the profile/content system 300 is directed to the profile/content system 300 from a plurality of the data sources 105. Data is "directed" to the profile/content system 300 when the data is intentionally sent to the profile/content system 300. Data is not considered to have been intentionally sent to a system, and is, thus, not directed to a system, that receives data by monitoring or intercepting data that is sent to another system. In at least one embodiment, data that is directed to profile/content system 300 when the data addressed to the profile/content system 300. In at least one embodiment, data addressed to the profile/content system 300 is associated with an Internet protocol (IP) address, such as a uniform resource locator (URL), of the profile/content system 300. In at least one embodiment, profile/content system 300 receives data directly sent to profile/content system 300 by, for example, an application 204.X (FIG. 2) and/or one or more other data sources of data sources 105. In operation 404, the compilation profile server 302 generates one or more of compilation profiles 304. The generation of one or more compilation profiles 304 includes creating a new compilation profile 304.X and/or updating an existing compilation profile 304.X.

The profile/content system 300 obtains data from one or more of data sources 105 either by retrieving the data from the one or more data sources 105 or receiving data from the one or more data sources 105 without a request. The precursor to receiving the data used to generate the compilation profiles 304 is a matter of design choice. In at least one embodiment, receiving data involves data sources 105 pushing data to profile/content system 300. "Pushing" data means that the data is sent to data profile/content system 300 without responding to a CONTENT REQUEST. In at least one embodiment, the profile/content system 300 retrieves data by actively requesting data from one or more of the data sources 105. In at least one embodiment, to retrieve data the profile/content system 300 requests data from one or more data sources 105. In at least one embodiment, the profile/content system 300 automatically requests data from one or more of the data sources 105 on, for example, a periodic basis. In at least one embodiment, the profile/content system 300 responds to external stimuli and requests data from one or more of the data sources 105. In at least one embodiment, an external stimulus is a CONTENT REQUEST from ICD 106.X. The CONTENT REQUEST prompts the profile/content system 300 to generate a compilation profile 304.X for the user of the requesting ICD 106.X. In at least one embodiment, profile/content system 300 receives both requested data and data pushed to profile/content system 300.

The profile/content system 300 uses the received data to generate compilation profiles 304. In at least one embodiment, the profile/content system 300 transforms the received data into compilation profiles 304. In at least one embodiment, the profile/content system 300 has preestablished relationships with one or more of the data sources 105 for collecting at least passive data used to generate compilation profiles 304. For example, in at least one embodiment, data provider 110.X is a data aggregator or Facebook Connect, and arrangements have been made either manually or automatically for the data provider 110.X to push passive data associated with a user or users of one or more of ICDs 106.0-106.N and/or provide the passive data in response to a data request from profile/content system 300. In at least one embodiment, the prearranged relationship with the data provider 110.X includes prearranged protocols, web services, formats and nomenclature for various pieces of data. For example, an exemplary prearranged format specifies the type and order of data within a data transmission, such as last name, first name, middle name, age, gender, ICD identifier, city, state, postal code, social graph, and so on.

Figure 5:
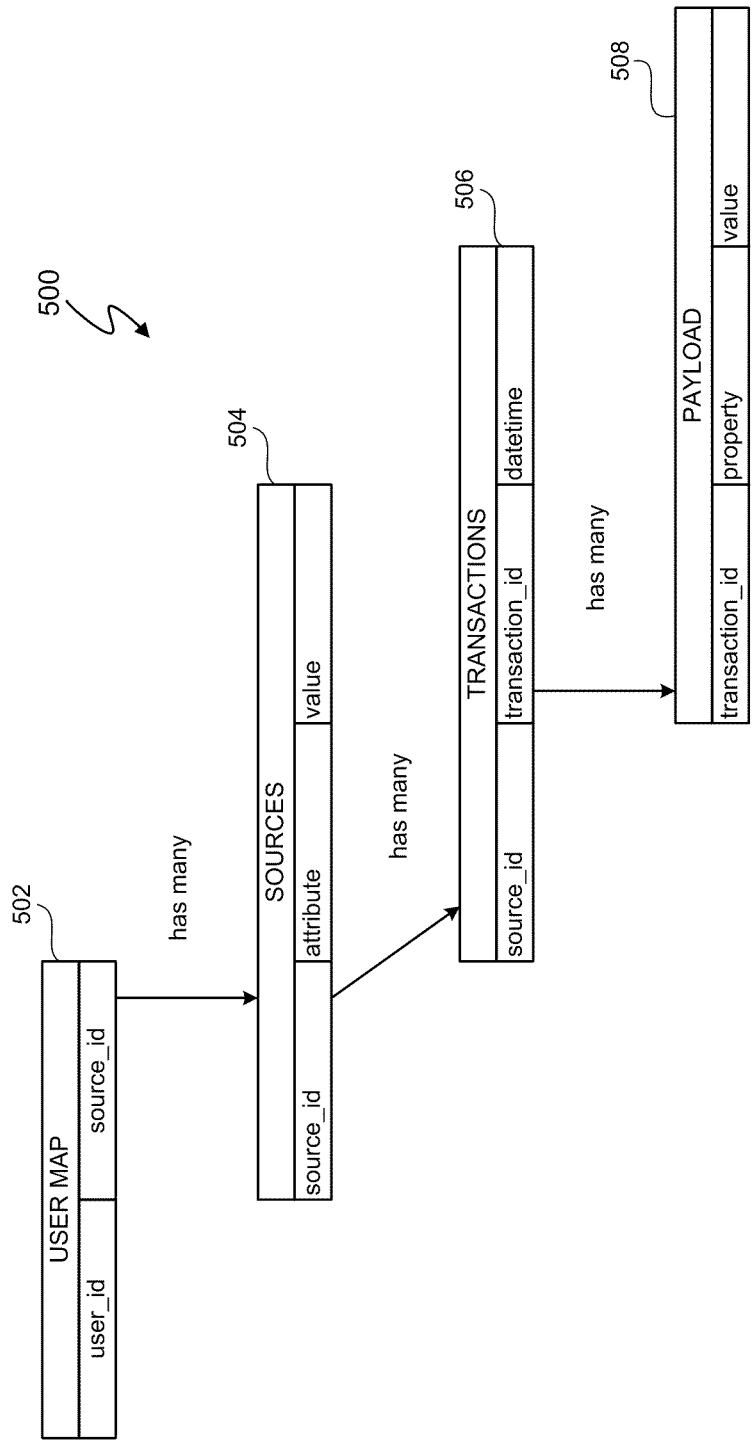
FIG. 5 depicts an exemplary compilation profile data structure.

FIG. 5 depicts an exemplary data structure 500 that is used to, for example, store passive data, including passive data about a user, as well as organize, access, and update compilation profiles 304. The particular data structure used by compilation profile engine 302 to store and organize the compilation profiles 304 is a matter of design choice. Referring to FIGS. 3, 4, and 5, in at least one embodiment, the compilation profile engine 302 utilizes a relatively denormalized data structure 500 to store and organize the compilation profiles 304. The data structure 500 allows flexibility in defining data sources 105 and the data received from each of data sources 105. In the data structure 500, each user of an ICD 106.X is associated with a compilation profile 304.X that contains data from multiple data sources 105. The provider/content server 300 receives data from the data sources 105 via one or more transactions. Each transaction contains one or more data elements, classified as (property, value) pairs. Each data source 105.X is a combination of both where the data originates from along with for which user identifier this data is associated. Not every one of data sources 105 needs to use the same user identifier.

The exemplary data structure 500 includes four (4) primary tables 502, 504, 506, and 508. Tables 502, 504, 506, and 508 are used to represent the relationships in the data structure 500:

a. USER_MAP table 502 associates a user_id with one or more source_id's. A user_id is a unique identifier associated with a user of an ICD 106.X. A source_id is a unique identifier associated with a data source 105.X. A source_id can be associated with more than one user_id and a user_id is commonly associated with more than one source_id. The user_map table 502 contains unique pairs of (user_id, source_id).

b. SOURCES table 504 describes the characteristics of any given data source 105.X. Each data source 105.X has a unique source_id and is mapped to one or more characteristic values. For example, the characteristic values for data originating from a single MCD with id=17 may be; (17, type, mobile_phone), (17, device, iPhone), (17, carrier, AT&T), and (17, International Mobile Equipment Identifier (IMEI), 350077-52-323751-3). The sources table 504 contains (source_id, attribute, value) rows. The combination of source_id and attribute is unique in the source table 504 rows. Data about a particular user's applications, such as one or more of applications 204.1-204.R, is also passive data about a user. Thus, the sources table 504 also includes passive data about a user.

c. TRANSACTIONS table 506 contains a listing of transactions where data is received by the provider/content server 300 from a given data source 105.X. Each row in transactions table 506 contains contextual information regarding the transaction itself, such as (date, time, gps location, etc.). The transactions table 506 contains (transaction_id, source_id, {any context information required}) rows. Transaction_id's in the transactions table 506 are unique.

d. PAYLOAD table 508 also contains passive data 304 for any given transaction from a given data source 105.X. In at least one embodiment, the passive data 304 is the data of the compilation profiles 304 for each user of ICDs 106.0-106.N. Payload table 508 contains (transaction_id, property, value) rows. The combination of transaction_id and property is unique.

In at least one embodiment, data in the payload table 508 and data in sources table 504 identifying an application of a user represents the compilation profiles 304 of all users identified in the USER_MAP table 502. As subsequently described in more detail, queries are formulated to access a compilation profile 304.X of a specific ICD 106.X user. Table 5-Table 8 represent respective examples of tables 502-508:

Exemplary Payload Table 508:

TABLE 5

| Transaction_ID | Attribute | Value |
|---|---|---|
| 1 | name | Jane Doe |
| 10 | age | 33 |

TABLE 5-continued

| Transaction_ID | Attribute | Value |
| --- | --- | --- |
| 10 | gender | female |
| 11 | marital_status | married |
| 12 | name | Jane Doe |
| 12 | income | 30,000 |
| 12 | vehicle | Honda Accord |
| 13 | likes_coupons | yes |
| 13 | preference | College Basketball |
| 13 | preference | Country music |

Exemplary Transactions Table 506:

TABLE 6

| Transaction_id | Source_id | Timestamp |
| --- | --- | --- |
| 10 | 1 | Aug. 8, 3009, 12:01 pm |
| 11 | 3 | Aug. 8, 2009 1:31 am |
| 12 | 8 | Aug. 13, 2009 7:26 pm |
| 13 | 1 | Aug. 26, 2009 8:12 am |

Note that in Table 6 data from a given data source 105.X can be received more than one time. For example, transactions 10 and 13 both represent data originating from Source_ID 1.

Exemplary Sources Table 504: [Note that the Attributes with an "*" Describe the for which User the Source should be Applied]:

TABLE 7

| Source_ID | Attribute | Value |
| --- | --- | --- |
| 1 | device_type | mobile_phone |
| 2 | device_type | Computer |
| 3 | device_type | IP_TV_box |
| 5 | application_name | Breakup |
| 6 | application_name | ICanHasCheeseburger |
| 1 | application_name | MovieShowtimes |
| 2 | application_name | Photoshop |
| 4 | data_provider | AT&T |
| 8 | data_provider | facebook_connect |
| 3 | ip_address* | 192.168.1.1 |
| 1 | phone_number* | 512-555-1234 |
| 1 | IMEI* | 350077-52-323751-3 |
| 8 | email_address* | jdoe@abc.com |

The Source_ID 1 represents data that originates on an MCD (with phone number 512-555-1234 and IMEI 350077-52-323751-3) from the application MovieShowtimes. Source_ID 8 represents data that originates from facebook_connect for the user jdoe@abc.com.

Exemplary user_map Table 502:

TABLE 8

| User_id | Source_Id |
| --- | --- |
| 100 | 1 |
| 100 | 3 |
| 100 | 8 |
| 101 | 2 |
| 101 | 3 |
| 101 | 4 |
| 101 | 5 |
| 101 | 6 |

User 100 is associated with sources 1, 3, 8, and user 101 is associated with sources 2, 3, 4, 5, 6. Users can share data originating from a particular data source 105.X. For example, in this embodiment, users 100 and 101 share data that originates based on Source_ID 3.

Referring to FIGS. 3 and 4, once operation 404 completes, the compilation profile engine 302 optionally executes operation 406. Operation 406 creates new compilation profile data for table 508 by analyzing and inferring additional data about a user. For example, based on a particular area code, compilation profile engine 304 may be able to infer a city and/or state of a user. Based on a particular name, compilation profile engine 304 may be able to infer a gender of a user. Based on a particular global positioning satellite (GPS) location of an ICD 106.X, compilation profile engine 304 may be able to infer a domicile of a user or whether the user is traveling based upon a previously recorded domicile, and so on. Based on a social graph, compilation profile engine 304 may be able to infer, for example, particular preferences or interests of a user. For example, if user 100 has two friends, user A and user B, that have similar profiles. If users A and B have similar interests, such as interest in outdoor activities or a particular hobby, then compilation profile engine 304 can infer that user 100 has similar interests as users A and B.

The profile/content system 300 also includes stored placement rules 306. Placement rules 306 govern the selection of content 308 to be provided to an ICD 106.X and placed by an application of the ICD 106.X for presentation to a user of the ICD 106.X. Exemplary placement rules 306 are that the content should only be provided between a certain range of times, only be provided a certain number of times to the same user, be provided at a minimum or maximum frequency to a user, may only be provided on a specific date or between certain dates, and so on. In at least one embodiment, placement rules 306 correlate with at a subset of the attributes of payload table 508. Placement rules 306 can also include preferences for selection such as a particular:

a. gender,
b. age range,
c. demographics,
d. location,
e. education,
f. language,
g. credit score,
h. household income,
i. marital status,
j. social graph,
k. click history,
l. purchase behavior,
m. bandwidth of mobile network (e.g. wifi vs Edge vs 3G),
n. type of device (iPhone vs Android),
o. carrier (AT&T vs Sprint, etc.

In at least one embodiment, the profile/content system 300 operates in at least one of three modes: (1) a direct content provision mode, (2) an indirect content provision mode, and (3) a compilation profile provision mode.

In at least one embodiment, the compilation profile 304 includes non-behavioral data, non-contextual data, and any combination of at least one, two, three, four, five, six, or all members of a group consisting of:

i. data about the user;
ii. a request for advertising originating from a first application of the mobile communication device;
iii. a request for advertising originating from a second application of the mobile communication device;
iv. advertising preference information directly provided by the user of the mobile communication device to an advertising server system;
v. identification of a mobile application of the mobile communication device;

vi. behavioral data of the user; and
vii. information inferred by analyzing any of the data in elements i-vi.

Data about the user includes personal characteristics of a user, such as the user's age or age range, gender, marital status, income or income range, etc., preferences of a user, and application configurations of a user. In at least one embodiment, preferences of a user are indicated by data provided by a specific application on an ICD or provided by a user directly. For example, a Fandango™ application may store and send a movie preference of a user, such as the user prefers action movies or scary movies, or a user prefers a particular sports team or teams as indicated by an ESPN™ application. A particular configuration of an application can indicate data about the user. For example, a music application such as Shazam™ can indicate a music genre configuration, such as Jazz music, country music, classical, and/or pop music.

Figure 6:
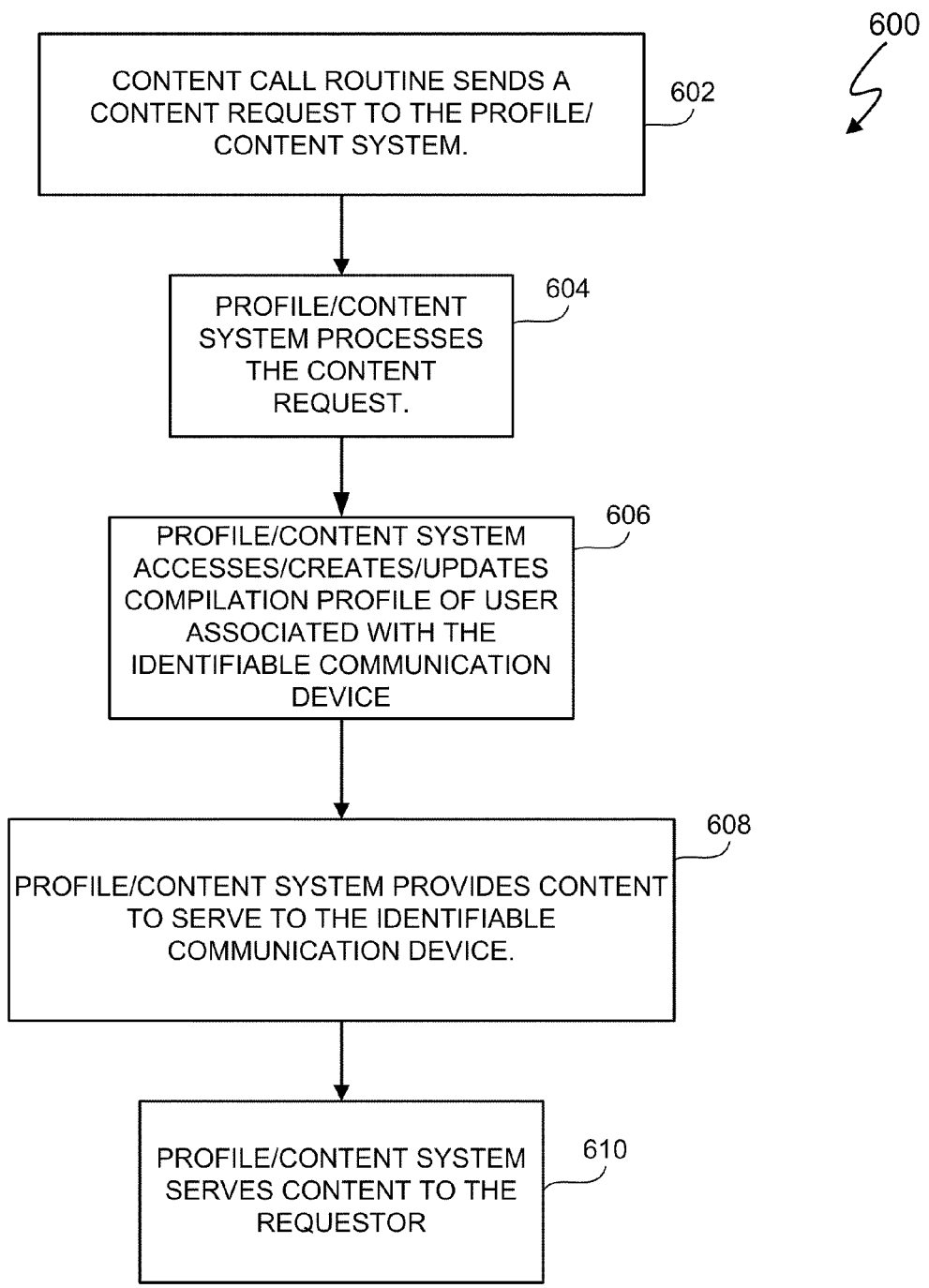
FIG. 6 depicts an exemplary direct content provision process for the profile/content system of FIG. 3.

FIG. 6 depicts direct content provision process 600, which represents one embodiment of a direct content provision mode of profile/content system 300. Referring to FIGS. 3 and 6, in operation 602 an ICD 106.X, such as MCD 202, sends a content request to profile/content system 300. The particular content request depends on the nature of the requested content. In at least one embodiment, the content request represents a request for an advertisement or other request in which a compilation profile can be used to provide targeted to the requesting ICD 106.X. The content request can be an unsolicited or solicited content request. The content request can include contextual data that identifies a source of the request and other information about the requesting ICD 106.X such as the location of the ICD 106.X. In operation 604, the profile/content system 300 processes the content request. Processing the content request can include any number of operations such as determining an identification of the requesting ICD 106.X, identification of the requesting native application (such as application 204.X), identifying the location of the requesting ICD 106.X, etc. In operation 606, compilation profile engine 302 accesses a compilation profile 304.X of the user associated with the ICD 106.X. If a compilation profile 304.X does not exist for the user associated with the ICD 106.X, in at least one embodiment, operation 606 generates a compilation profile 304.X for the user associated with the content request as, for example, described with reference to compilation profile generation process 400. In at least one embodiment, the user associated with ICD 106.X does not need to register or provide profile information with profile/content system 300 or any other system in order to have a compilation profile 304.X. In at least one embodiment, if a compilation profile 304.X exists for the user, the profile/content system 300 also updates the existing compilation profile 304.X with additional information obtained from other data sources 105.

In at least one embodiment, the payload data in payload table 508 includes the compilation profiles 304.X. Referring to FIGS. 3, 5, and 6, with the compilation profile data structure 400, in at least one embodiment, to generate the compilation profile 304.X for a user associated with the content request, operation 606 reads all payload data in payload table 508 for each transaction associated with any data source 105 that is linked to the user in the user-map table 502. Operation 606 can also read data from sources table 504 to identify information about a user's applications, such as the name of a user's applications. Assuming that the user is user 100 in the user_map table 502, in at least one embodiment, operation 606 can be accomplished with a structured query language ("SQL") query for user 100 such as:

```
SELECT p.property, p.value
    FROM users_map u, transactions t, payload p
    WHERE u.user_id = 100 AND
        u.source_id = t.source_id AND
        t.transaction_id = p.transaction_id
```

In at least one embodiment, compilation profile engine 502 can create a view across the tables 502-508 to aid in query and reporting. Creating such views is well-known to persons of ordinary skill in the art.

A possibility of a data overlap problem exists in the compilation profile data read in operation 606. In at least one embodiment, a data overlap problem includes potential conflicts between data and data redundancy. Overlapping data occurs when multiple payload items in PAYLOAD table 508 exist for the same property for the same user. In at least one embodiment, if overlapping data exists in the data read to generate compilation profile 304.X, operation 606 uses a "most recently received" data and ignores older and potentially "stale" data to resolve one or more problems associated with data overlap. The particular way of reading the most recent data for a property is a matter of design choice. In at least one embodiment, operation 606 reads the most recently received data by augmenting the read query and only considering the first value read for each of the properties. An exemplary, augmented query is:

```
SELECT p.property, p.value, t.timestamp
    FROM users_map u, transactions t, payload p
    WHERE u.user_id = 100 AND
        u.source_id = t.source_id AND
        t.tranaction_id = p.transaction_id
    ORDER BY p.property, t.timestamp DESC
```

In another embodiment, compilation engine 302 addresses data overlap on reading by assigning priorities to each property for each Source_ID. Thus, in operation 606, different data received from specific sources can be considered ahead of the same data received from a less trustworthy source. Thus, in at least one embodiment, an additional PRIORITIES table is added to compilation profile data structure 500. The PRIORITIES table maps the tuple (Source_Id, Property, Priority). Operation 606 gives precedence to higher priorities. Table 9 represents an example of a PRIORITIES table:

TABLE 9

| Source_ID | Property | Priority |
|---|---|---|
| 1 | Name | 1 |
| 1 | Age | 2 |
| 8 | Name | 2 |
| 8 | Age | 1 |

The PRIORITIES Table 9 provides fine grain control of the prioritization. In the event of overlapping conflict, the Name property found from Source_Id 8 is considered higher priority than the Name property found from Source_Id 1, but is reversed for Age, i.e. the Age property found from Source_Id 1 is higher priority than Age property found from Source_Id 8. In at least one embodiment, the compilation profile engine 202 generates and stores the priority data via an automated process as opposed to being set manually on a per Source_Id/Property basis. There are many ways to implement fine-grained tie-breakers in the case of property overlap, and the particular automated process is a matter of design choice. For example, an exemplary automated process uses generic specifications, via regular expression-based rules, of which characteristics (attributes and data-values) of each data source 105 rank higher on a per property basis. For example, Facebook Connection may be a more trusted data source 110.X for gender information and a carrier may have more reliable phone number information. In at least one embodiment, automating the prioritization process minimizes the amount of data maintenance required, but could hamper the ability to "see" prioritization memorialized in the PRIORITIES table. In at least one embodiment, the information from the PRIORITIES table can be integrated into the read query of operation 606 using standard SQL OUTER JOIN syntax or accessed and considered as a tie-breaker after the reading. Thus, in at least one embodiment, the profile/content system 300 transforms the data in the PAYLOAD table 508 into a compilation profile 304.X.

As previously mentioned, in at least one embodiment, if a compilation profile 304.X of a user already exists, operation 606 updates the compilation profile 304.X of the user associated with a CONTENT REQUEST. In at least one embodiment, the compilation profile data structure 500 has the beneficial characteristic that data for a new transaction for any given data source 105.X can be stored to the tables 502-508 at any time, without the need to check for and correct potential data overlap or conflicts.

In at least one embodiment, the compilation profile data structure 500 described in the current embodiment has the additional beneficial characteristic that each data source 105, even for the same user, may use a different identifier for the user. In at least one embodiment, all that is required by this embodiment as that the compilation profile engine 302 update linking of the USER_MAP table 502 User_Id to a user identifier present in the SOURCES table 504 for this user.

In at least one embodiment, the profile/content system 300 is agnostic as to when and how data is obtained by profile/content system 300. As long as a transaction record is created in the TRANSACTIONS table 506 when Payload data is stored in the compilation profiles 304, the compilation profiles 304 are automatically updated. In at least one embodiment, the compilation profile engine 302 utilizes three (3) primary mechanisms for augmenting the compilation profiles 304:

i. A data source 105.X sends data to the profile/content system 300, and profile/content system 300 receives the sent data. Information describing the data source 105.X, and the unique identifier associating the user with that data source 105.X, is sent along with the passive (payload) data 206. An example would be an application 204.X on a mobile phone causing a phone number and IMEI number to be sent along with the passive data 306 (e.g. user's name, age, and gender). Another example would be an IP_TV type data source 105.X sending an Internet protocol ("IP") address along with the number of hours the IP_TV box has been in use during the day (i.e. the passive data 304).
  ii. The profile/content system 300 retrieves data from a data source 105.X: From time to time, the profile/content system 105.X may collect data from other data sources 105 associated with one or more users based on information in the users' compilation profile 304.X. As an example, given a users' email address and Facebook Connect authorization (stored in the compilation profile 204 for that user), the profile/content system 500 will automatically retrieve, from Facebook.com servers, additional information to be stored in the users' compilation profile 204.X. The profile/content system 300 can generate "inferred" data based on information in the users' compilation profile 304.X. An example would be to store and infer a user's age or gender based on the user's mobile application usage behavior.
  iii. The profile/content system 300 can also infer data based on information of individuals connected to a user that can provide insight about a user, such as a user's interests and preferences. The information of the connected individuals can be obtained, for example, from social graphs of particular entities such as the Internet web site Facebook's social graph.

In at least one embodiment, data obtained from data sources 105 does not have to be normalized before being written to either the SOURCES table 504 or the PAYLOAD table 508. Whether to (or when to) normalize the property information or associated values is a matter of design choice and depends on, for example, the semantics used by the profile/content system 300 implemented on a per installation basis. In at least one embodiment, data sources 105 that provide data to profile/content system 300 adhere to normalized dictionary, which facilitates storage and interpretation of the data by profile/content system 300.

In at least one embodiment, there is no semantic issue with data redundancy in the PAYLOAD table 508 across transactions. In at least one embodiment, the compilation profile engine 302 stores all (property, value) data to the PAYLOAD table 508 on each transaction. Although storing all data uses more physical space, storing all data allows for a full historical reporting of transactions. In at least one embodiment, the compilation profile engine 302 stores data to the PAYLOAD table 508 only when the data value for a given property has changed for the current data source 105.X since a previous write operation. Storing based only on changes yields a more compact physical representation but loses the benefit of full persistent history.

Figure 7:
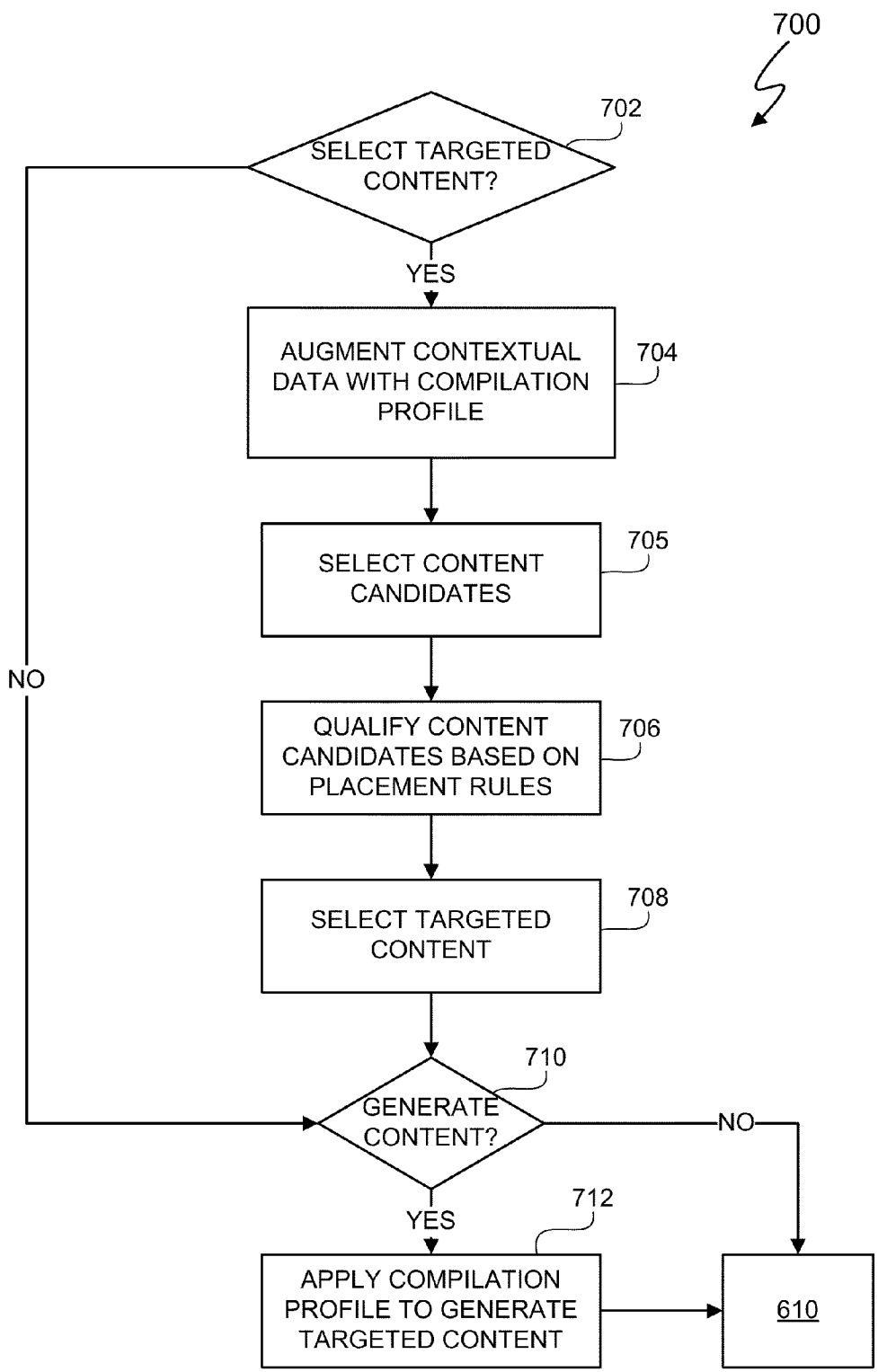
FIG. 7 depicts an exemplary content provisioning process for the profile/content system of FIG. 3.

In operation 608, the profile/content system 300 provides targeted content 308.X to serve to the ICD 106.X. FIG. 7 depicts an exemplary content provisioning process 700, which represents one embodiment of operation 608. In general, the content provisioning system 700 obtains content by selecting the content, dynamically generating the content, or combining selected content with dynamically generated content. In operation 702, the compilation profile engine 302 determines whether to select content from the preexisting content 308. If yes in operation 702, in operation 704 compilation profile engine 302 augments the contextual data with the compilation profile 304.X associated with a user of the ICD 106.X. For example, the contextual data does not include the age, gender, or other personal data associated with the user, and operation 704 augments the contextual data with the compilation profile 304.X.

Figure 8:
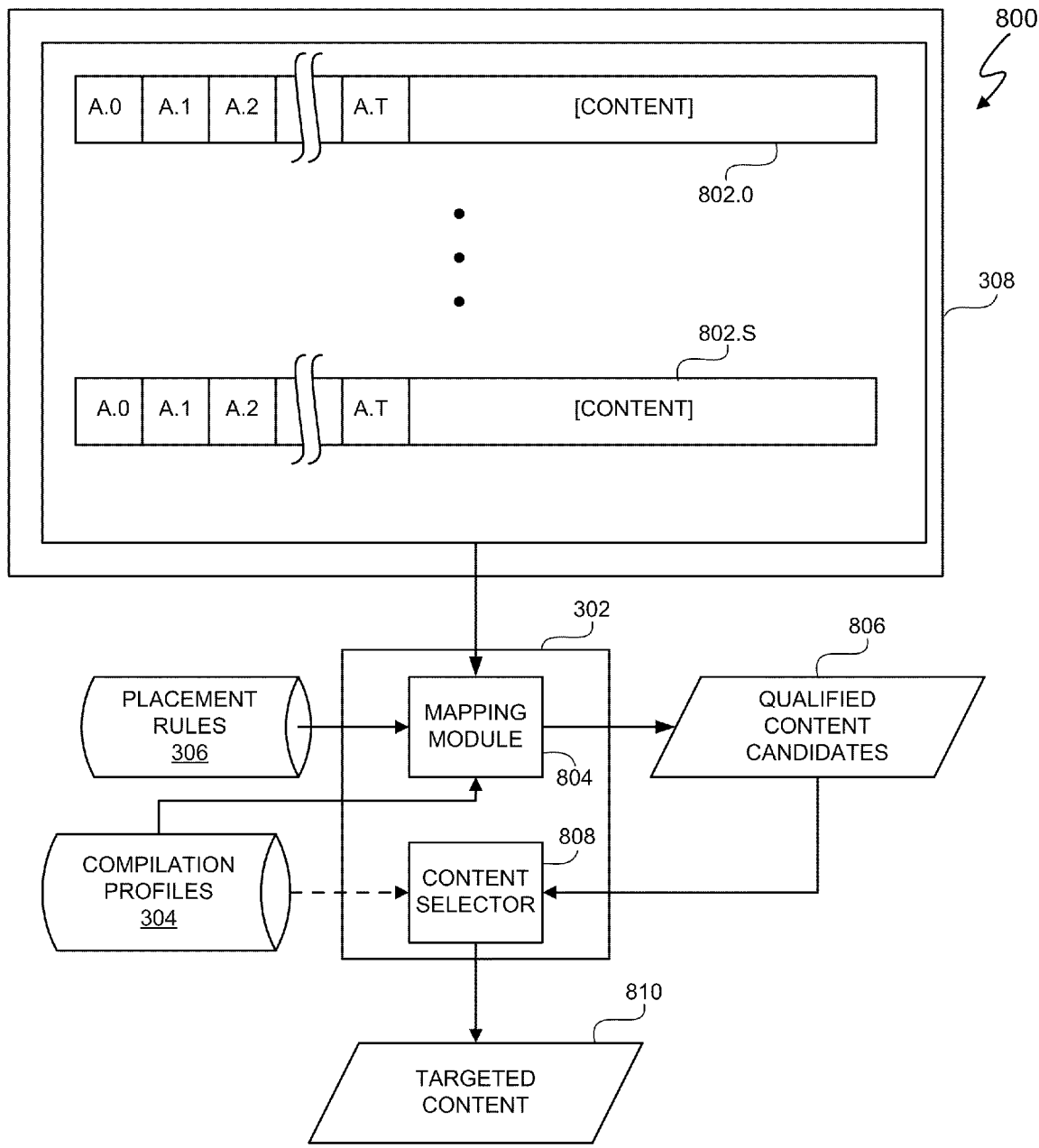
FIG. 8 depicts an exemplary content selection system 800.

FIG. 8 depicts content selection system 800. The content selection system 800 is a subsystem of profile/content system 300. The content selection system 800 represents one implementation of operations 705, 706, and 708. In at least one embodiment, operation 705 selects content candidates 802.0-802.S from content 308 that comply with the contextual data augmented with the compilation profile of the ICD 106.X user to whom the content is being targeted. For example, if the ICD 106.X user is Jane Doe, compilation profile engine 302 accesses the compilation profile 304.X of Jane Doe in Table 5. The compilation profile engine 302 selects content candidates 802.0-802.S that are appropriate for a person with Jane Doe's characteristics. The content candidates 802.0-802.S represent exemplary individual content of content 308. In at least one embodiment, each of the S+1 content candidates 802.0-802.S is associated with T+1 attribute fields A.0-A.T. S and T are respective integer indexes greater than or equal to 0. In at least one embodiment, the number of attribute fields A.0-A.T and/or the number of attributes for each content candidate 802.0-802.S can vary across content candidates. In other words, content candidate 802.0 can have a different number of fields and/or a different number of attributes than content candidate 802.1, and so on.

In operation 706, the content server 304 processes the placement rules 306 to identify each of the content candidates 802.0-802.S that comply with the placement rules 306 and is, thus, qualified to be served to one or more ICDs associated with the user of the requesting ICD 106.X. The mapping module 804 qualifies the content candidates 802.0-802.1 by mapping the placement rules 306 to content candidates 802.0-802.S and determining which of the content candidates 802.0-802.S comply with the placement rules 306. In at least one embodiment, the attribute fields of content candidates 802.0-802.S map to attributes in payload table 508 to facilitate the compliance determination. For example, in at least one embodiment, the content candidates 802.0-802.S have a preferred age range, location, gender, creation date, and so on. Thus, mapping module 804 determines which of the content candidates 802.0-802.S comply with the age range, location, gender, and creation date specifications of the placement rules 306 and, thus, become qualified content candidates 806. For example, in operation 705, all the content candidates 802.0-802.S have attributes that are appropriate for Jane Doe. In operation 706, if a particular content candidate 802.X is for women only with no other attribute, then content candidate 802.X becomes a qualified content candidate 806.X. If a particular content candidate 802.Y is for women who are over 50 years of age, then content candidate 802.Y does not become a qualified content candidate 806.

In operation 708, content selector 808 selects the targeted content 810 from the qualified content candidates 806 to serve. The particular manner of selecting the targeted content 810 is a matter of design choice. In at least one embodiment, the content selector 808 selects content from the qualified content candidates 806 whose attributes most closely match the user's compilation profile 304.X. Optimization and matching algorithms are well-known to those of ordinary skill in the art. In at least one embodiment, content selector 808 includes an optimization engine that selects the targeted content 810 based upon, for example, predetermined criteria. For example, the content selector 808 can select targeted content 810 based on priorities such as the best applicability for the ICD 106.X user, historical effectiveness of the qualified content candidate 806, compensation rate, and so on. Referring to FIGS. 6 and 8, in operation 610, the data server 310 then serves the targeted content 810 to a requestor of the targeted content. In at least one embodiment, the requestor is an application, such as application 204.X (FIG. 2) executing on the ICD 106.X, and the ICD 106.X itself is a receiving conduit for the targeted content that is served to the application. In at least one embodiment, the application 204.X is not a web browser and is not an operating system of the ICD 106.X.

If the outcome of operation 702 is "no" or after operation 708, operation 710 determines whether to dynamically generate content. In at least one embodiment, the determination of whether to dynamically generate content is based on whether the content selected in operation 708 is amenable to augmentation with dynamically generated content. In at least one embodiment, if operation 702 proceeds directly to operation 710, the determination of whether to dynamically generate content is based on whether the dynamic content can be generated that aligns with the compilation profile of the ICD 106.X user. If the answer is "yes" in operation 710, in operation 712 content generator 312 applies the compilation profile 304.X to generate targeted content. For example, if the compilation profile 304.X indicates the user is a male, the background of the generated content will be blue, whereas for a female it would be red. In another embodiment, a title and particular discount percentage of the content is dynamically determined. For example, if the compilation profile 304.X indicates that the user was a previous customer, a 'discount' content is titled "a loyalty discount" for 15% off. If the compilation profile 304.X indicates otherwise, the discount is titled "new customer" discount for 25% off. In at least one embodiment, operation 712 uses contextual data regarding, for example, the user's environment to generate dynamic content. For example, if weather data obtained from a data provider 110.X indicates decreasing temperatures in the local area of the user as indicated in the user's compilation profile 304.X, in at least one embodiment, operation 712 generates an advertisement for coats at a store in the local area of the user. If data provider 110.X indicates that traffic is bad in the vicinity of the user as indicated by the most recent GPS coordinates in the user's compilation profile 304.X, then operation 712 generates an advertisement for 'recorded books' or more fuel efficient transportation. In operation 710, content generator 312 can also generate the entire targeted content 810 dynamically.

If the answer to operation 710 is "no" or after operation 712, the exemplary content provisioning process 700 proceeds to operation 610 (FIG. 6). In operation 610, data server 310 serves the content provided in operation 608 to ICD 106.X and/or one or more other of ICDs 106.0-106.N associated with the user of ICD 106.X.

Examples of the type of targeted content 810 that can be provided by at least one embodiment of profile/content system 300 using passive data, such as data about a user, in a compilation profile 304.X are:

a. Dynamic advertisements served and optimized based on one or more compilation profiles of a user.
b. Localized content, such as local advertisements, offers and coupons served and optimized based on one or more compilation profiles of a user. Exemplary features of the compilation profile(s) used to server localized content include user preferences, location, percentage price discounts, and percentage monetary discounts.
c. Mobile commerce offers and advertisements served and optimized based on profile. Exemplary features of the compilation profile(s) used to server mobile commerce offers and advertisements include user preferences, location, percentage price discounts, and percentage monetary discounts.
d. Recommended content, such as types of applications, type of news (e.g. a web site of the Cable News Network (CNN)) serves a female focused related article to women and a male focused article to men based on the user's compilation profile(s).
e. Advertisement format served and optimized based on the user's compilation profile(s). For example, the use of a larger advertisement, such as a skyscraper advertisement, versus a smaller display or rich media to smaller display banner, etc.

Figure 9:
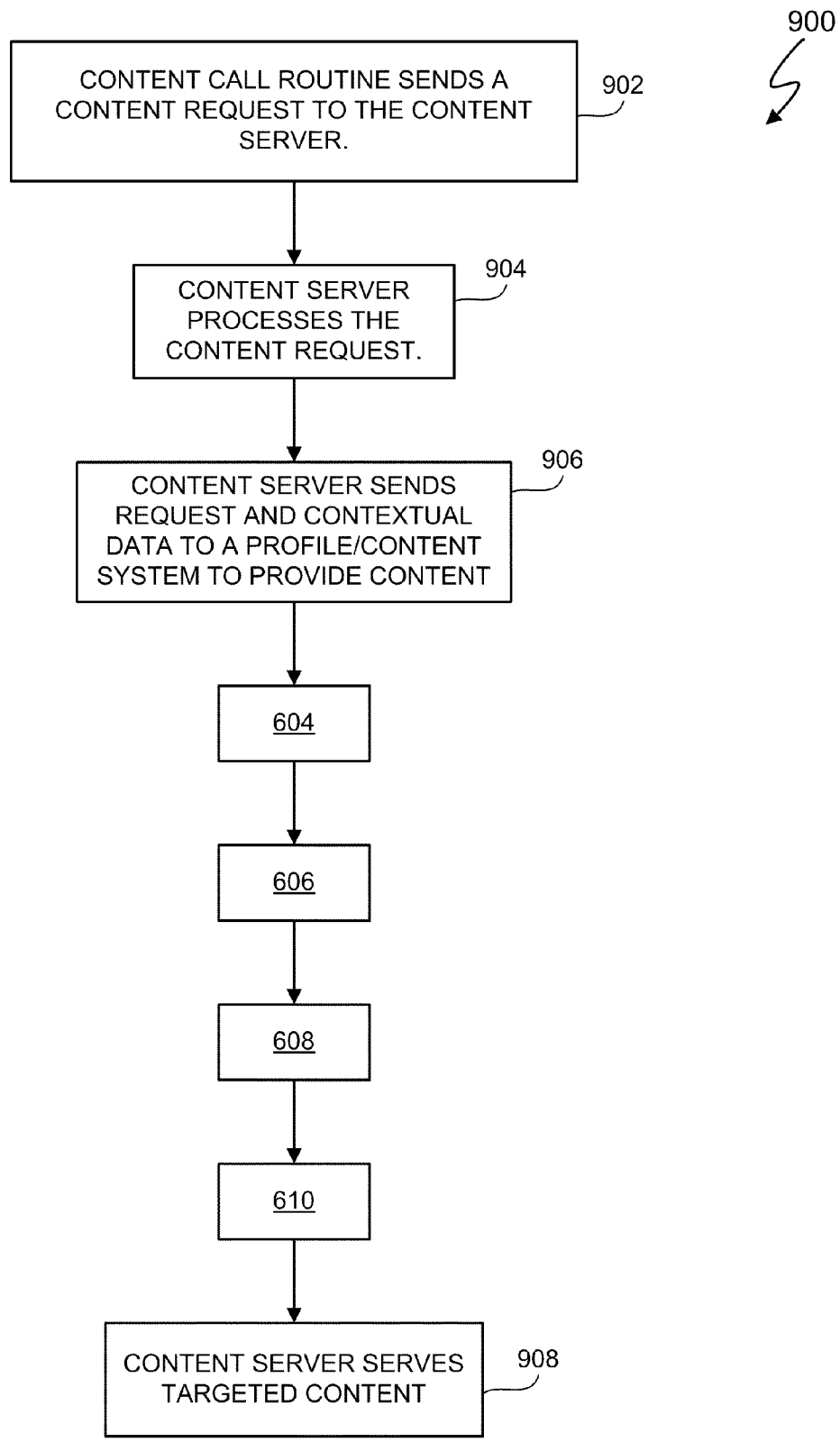
FIG. 9 depicts an exemplary indirect content provision process for the profile/content system of FIG. 3.

FIG. 9 depicts indirect content provision process 900, which represents one embodiment of an indirect provision mode of profile/content system 300. Referring to FIGS. 2, 3, and 9, in operation 902 a content call routine, such as content call routine 205.X, of an ICD 106.X sends a content request to a content server 108.X. In operation 904, the content server 108.X processes the content request and determines an identification of the user of ICD 106.X. The content request can include both active data and passive data. The content server 108.X sends a request to profile/content system 300 to provide content for the identified user. In at least one embodiment, the content server 108.X also provides the passive data in the original content request of ICD 106.X to allow profile/content system 300 to update or create a compilation profile 304.X for the user of ICD 106.X. Operations 604, 606, 608, and 610 operates as previously described except that in operation 610, the data server 310 provides the targeted content to content server 108.X rather than directly to ICD 106.X. In operation 908, content server 108.X serves the targeted content that was provided by profile/content system 300 to ICD 106.X and/or one or more other of ICDs 106.0-106.N associated with the user of ICD 106.X. In operation 906, the content server 108.X sends request for targeted content along with any contextual data to profile/content system 300. In at least one embodiment, the contextual data is then-real-time data provided transmitted by an ICD 106.X that provides some context to the content request. For example, in at least one embodiment, the contextual data indicates a location of the ICD 106.X.

Figure 10:
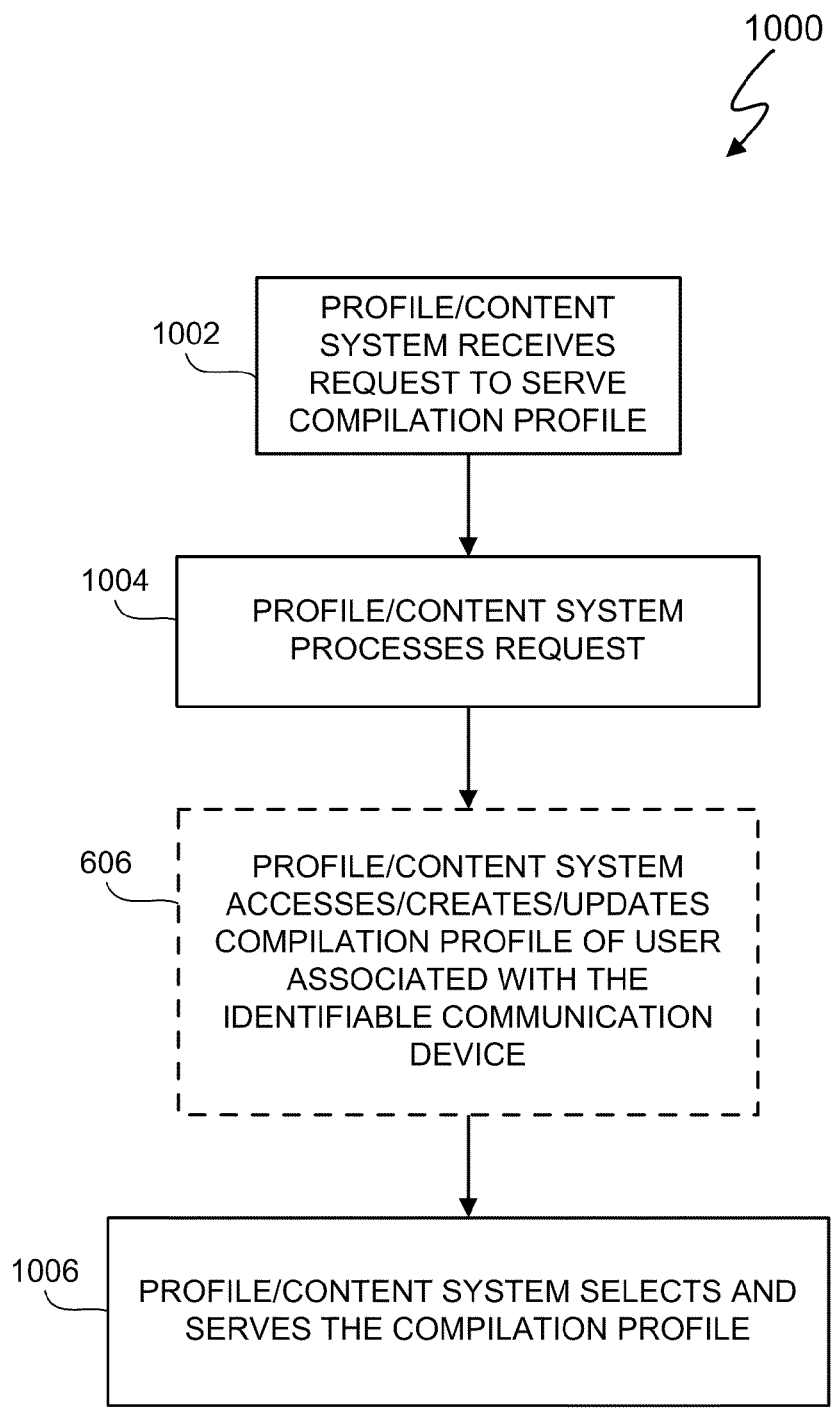
FIG. 10 depicts an exemplary compilation profile provision process for the profile/content system of FIG. 3.

FIG. 10 depicts a compilation profile provision process 1000, which represents one embodiment of a compilation profile provision mode of profile/content system 300. In at least one embodiment, a requestor such as a content server 108.X or any other requestor can request a compilation profile 304.X or multiple compilation profiles. For example, in one embodiment, the requestor prefers to select its own targeted content but would like information about a user of an ICD 106.X contained in a compilation profile 304.X of the user. Referring to FIGS. 2, 3, and 10, in operation 1002, profile/content system 300 receives a request to provide a compilation profile 304.X or multiple compilation profiles. In operation 1004, profile/content system 704, profile/content system compilation profile engine 302 processes the request to determine the nature of the request, which in this instance is a request for the profile/content system 300 to provide one or more compilation profiles. The compilation profile provision process 1000 then proceeds to operation 606, which operates as previously described to access, create, and/or update the requested compilation profile(s). In operation 1006, the data server 310 provides the data server 310 of profile/content system 300 serves the requested compilation profile(s) to the requestor and/or to one or more entities identified by the requestor.

The compilation profiles 304 have a variety of uses in addition to facilitating selection of targeted content. For example, in at least one embodiment, the compilation profiles 304 provide data to power analytics and analytic tools. The compilation profiles 304 can include data about a user such as personal attributes of the user, preferences of a user, application configuration data, and applications used by a user. For example, if the developers of a mobile phone application, such as the MovieShowtimes application, that causes the mobile phone application to display content (i.e. publishes content) wanted to know the demographic breakdown of users of the mobile phone application by gender, database 'read' queries of the following type are run to provide this information from the compilation profiles 304. For example, the following query against tables 502, 504, 506, and 508 determines the number of male users for the application with an application_name of 'MovieShowtimes':

```
SELECT COUNT(DISTINCT u.user_id)
    FROM users_map u
    WHERE
```

-continued

```
EXISTS
    (SELECT * FROM transactions t, payload p WHERE
        u.source_id = t.source_id AND
        t.transaction_id = p.transaction_id AND
        (p.property = 'gender' AND p.value = 'male'))
AND EXISTS
    (SELECT * FROM sources s WHERE
        u.source_id = s.source_id AND
        s.attribute = 'application_name' AND
        s.value = 'MovieShowtimes')
```

This type of query can be used for many different type of analysis, including but not limited to:

1. Tracking the unique and total visits to any advertiser-designated destination along with other data, following the delivery of content.
2. Providing data regarding overall market, or any market subset, by source or combination of sources, to any requesting party.
3. Providing data for optimization of actionable metrics.
4. Measuring user engagement for data sources or combinations of data sources
5. Providing advertisers analytics on the success of advertising campaigns
6. Providing publishers with analytics on the usage of their applications, including demographic user data for users of their applications.

The particular topology and implementation of profile/content system 102 is a matter of design choice. In at least one embodiment, profile/content system 102 is implemented as code executable, which is stored in a memory and executable by one or more processors. In at least one embodiment, the profile/content system 102 is stored as code on a tangible computer readable medium and executable by one or more processors. A tangible computer readable medium is medium such as a compact disk (CD), digital versatile disk (DVD), flash memory, or any other type of storage medium that is physical. In at least one embodiment, profile/content system 102 is implemented in a non-tangible medium such as an electromagnetic signal or optical signal. Tangible and intangible computer readable mediums are mutually exclusive.

Figure 11:
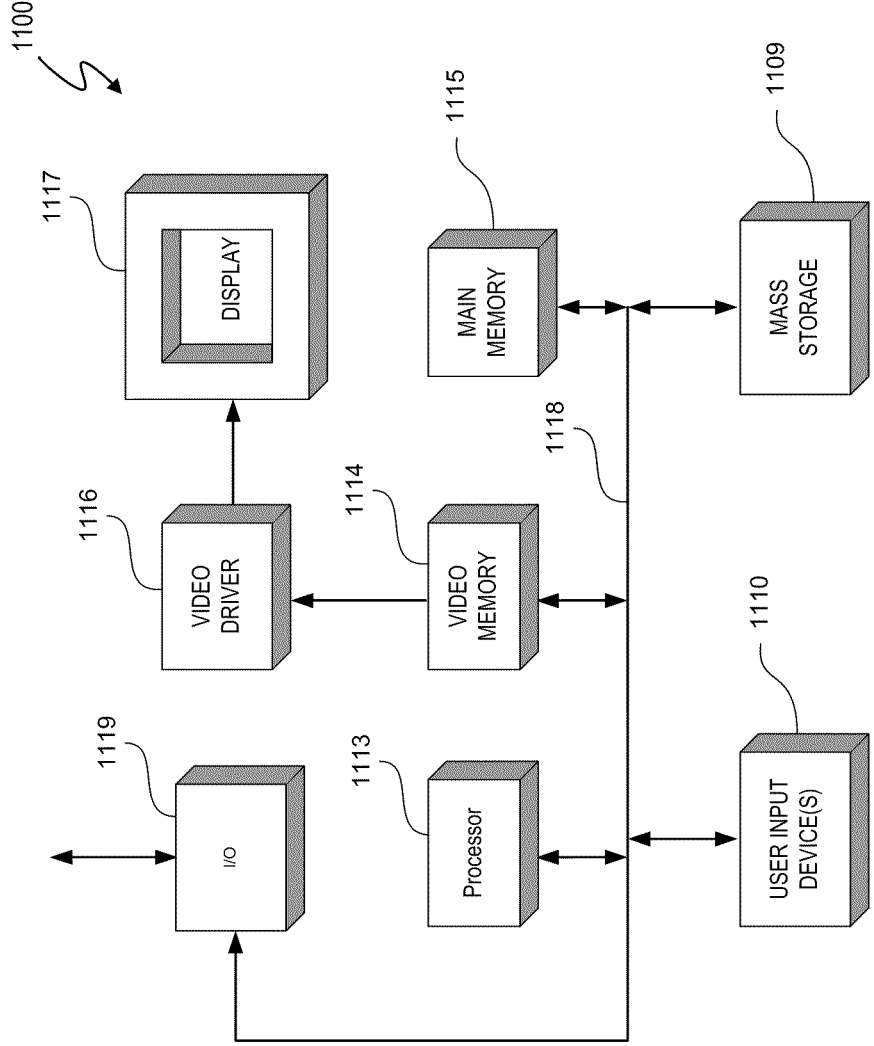
FIG. 11 depicts an exemplary general-purpose computer system.

FIG. 11 depicts a general-purpose computer system 1100. In at least one embodiment, embodiments of the profile/content system 102, content servers 108.0-108.M, data providers 110.0-110.P are implemented on respective data processing systems such as a general-purpose computer 1100 illustrated in FIG. 10. Input user device(s) 1110, such as a keyboard and/or mouse, are coupled to a bi-directional system bus 1118. The input user device(s) 1110 are for introducing user input to the computer system and communicating that user input to processor 1113. The computer system of FIG. 10 generally also includes a video memory 1114, main memory 1115 and mass storage 1109, all coupled to bi-directional system bus 1118 along with input user device(s) 1110 and processor 1113. The mass storage 1109 may include both fixed and removable media, such as other available mass storage technology. Bus 1118 may contain, for example, 32 address lines for addressing video memory 1114 or main memory 1115. The system bus 1118 also includes, for example, an n-bit data bus for transferring DATA between and among the components, such as CPU 1109, main memory 1115, video memory 1114 and mass storage 1109, where "n" is, for example, 32 or 64. Alternatively, multiplex data/address lines may be used instead of separate data and address lines.

I/O device(s) 1119 may provide connections to peripheral devices, such as a printer, and may also provide a direct connection to remote data processing systems such as content servers ICDs 106.0-106.N, 108.0-108.M, and data providers 110.0-110.P, via, for example, a telephone link or to the Internet. I/O device(s) 1119 may also include a network interface device to provide a direct connection to remote server data processing systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in a tangible computer readable medium, such as mass storage 1109 until loaded into main memory 1115 for execution. Computer programs may also be in the form of an intangible computer readable medium such as electronic signals modulated in accordance with the computer program and data communication technology when transferred via a network. The method and functions relating to profile/content system 102 may be implemented in a computer program alone to be performed by a computer system or, for example, in conjunction with application specific hardware.

The processor 1113, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 1115 is comprised of dynamic random access memory (DRAM). Video memory 1114 is a dual-ported video random access memory. One port of the video memory 1114 is coupled to video amplifier 1116. The video amplifier 1116 is used to drive the display 1117. Video amplifier 1116 is well known in the art and may be implemented by any suitable means. This circuitry converts pixel DATA stored in video memory 1114 to a raster signal suitable for use by display 1117. Display 1117 is a type of monitor suitable for displaying graphic images.

The computer system described above is for purposes of example only. The profile/content system 102 may be implemented in any type of computer system or programming or processing environment. It is contemplated that the processes of profile/content system 102 can be run on a stand-alone computer system, such as the one described above. The processes of profile/content system 102 can also be run from a server computer system that can be accessed by a plurality of client computer systems interconnected over a network.

In at least one embodiment, a profile/content system generates, accesses, and/or serves a compilation profile for targeting content to ICDs. The profile/content system generates the compilation profile using data from multiple data sources.

Although the present invention has been described in detail, it should be understood that various changes, substitutions and alterations can be made hereto without departing from the spirit and scope of the invention as defined by the appended claims.

What is claimed is:

1. A method comprising:
  performing by a computer system programmed with non-transitory, instruction code stored in a memory and executed by a processor operating in the computer system to transform the computer system into a machine for:
    receiving data that associates a user with a mobile communications device, wherein the mobile communications device is separate from the computer system;
    receiving data directed to the computer system from multiple data sources, wherein the data received is associated with the user, the data received includes passive data, the passive data includes data about the user received from two or more of the multiple data sources and at least one of the data sources of the passive data resides separate from the mobile communications device and the computer system, and at least one of the data sources is a data aggregator that does not engage in a direct communication session with an identifiable communication device of the user and the passive data received from the data aggregator is not collected from the direct communications session with the identifiable communication device of the user;
    storing the data received including the passive data about the user in a data structure in a tangible, non-transitory computer-readable medium separate from the mobile communications device, wherein the data structure is configured for at least identifying the passive data about the user and for at least generating a compilation profile that includes the passive data about the user;
    processing the stored data, including the passive data from the data aggregator not collected from the direct communications session with the mobile communication device, with a compilation profile engine performing analytics on the stored data to generate a compilation profile of the user;
    using the compilation profile to obtain targeted content to provide to the mobile communications device, wherein the targeted content comprises one or more advertisements; and
    providing the targeted content to the mobile communications device.

2. The method of claim 1 further comprising:
  performing with the computer system:
    retrieving data associated with the user from at least one of the multiple data sources, wherein the data retrieved includes passive data and the passive data about the user is received from at least one of the multiple data sources.

3. The method of claim 1 wherein the generating of the compilation profile comprises:
  reading the compilation profile data of the user from a data storage device; and
  generating the compilation profile of the user from the compilation profile data.

4. The method of claim 1 wherein the receiving the data directed to the computer system from the multiple data sources comprises:
  receiving the passive data associated with the user from at least:
    i. one of the multiple data sources in receipt of passive data from an application on the mobile communication device; and
    ii. an application on the mobile communication device.

5. The method of claim 1 wherein the receiving the data directed to the computer system from the multiple data sources comprises:
  receiving the passive data about the user from at least two applications on the mobile communication device.

6. The method of claim 1 wherein the passive data about the user is in addition to any registration data about the user provided.

7. The method of claim 1 further comprising:
performing with the computer system:
providing the compilation profile of the user of the mobile communications device to a data processing system.

8. The method of claim 1 wherein the compilation profile includes non-behavioral data, non-contextual data, and at least two members of a group consisting of:
   i. data about the user including identification of a mobile application of the mobile communication device;
   ii. a request for advertising originating from a first application of the mobile communication device;
   iii. a request for advertising originating from a second application of the mobile communication device;
   iv. advertising preference information directly provided by the user of the mobile communication device to an advertising server system;
   v. behavioral data of the user; and
   vi. information inferred by analyzing any of the data in elements i-v.

9. The method of claim 1 wherein the passive data about the user comprises historical data that includes personal attributes of the user, preferences of the user, and data representing configuration choices accepted by the user of at least two of the multiple data sources from which passive data is received.

10. The method of claim 1 wherein the data about the user includes at least two members of a group consisting of: age, age range, gender, name, marital status, income, income range, vehicle driven, credit score, language, and education.

11. A method comprising:
performing by a computer system programmed with non-transitory, instruction code stored in a memory and executed by a processor operating in the computer system to transform the computer system into a machine for:
   processing data directed to the computer system from multiple data sources with a compilation profile engine performing analytics on the data to generate a compilation profile of a user of a mobile communications device, wherein the data is associated with the user, the data includes passive data, the passive data includes data about the user received from two or more of the multiple data sources and at least one of the multiple data sources of passive data resides separate from the mobile communications device and the computer system, and at least one of the data sources is a data aggregator that does not engage in a direct communication session with an identifiable communication device of the user and the passive data received from the data aggregator is not collected from the direct communications session with the identifiable communication device of the user; and
   providing the compilation profile of the user of the mobile communications device to a data processing system coupled to the computer system to allow the data processing system to utilize the compilation profile to provide targeted content to the mobile communications device, wherein the targeted content is obtained using the compilation profile of the user associated with the mobile communications device, the mobile communications device is separate from the data processing system and separate from the computer system, and the data processing system is separate from the computer system.

12. The method of claim 11 further comprising:
providing the targeted content to the mobile communications device.

13. The method of claim 11 wherein the passive data comprises historical data that is not required to be sent to a content server in order to elicit a response from the content server.

14. The method of claim 11 wherein the compilation profile includes non-behavioral data, non-contextual data, and at least two members of a group consisting of:
   i. data about the user including identification of a mobile application of the mobile communication device;
   ii. a request for advertising originating from a first application of the mobile communication device;
   iii. a request for advertising originating from a second application of the mobile communication device;
   iv. advertising preference information directly provided by the user of the mobile communication device to an advertising server system;
   v. behavioral data of the user; and
   vi. information inferred by analyzing any of the data in elements i-v.

15. A method comprising:
performing by a computer system programmed with non-transitory, instruction code stored in a memory and executed by a processor operating in the computer system to transform the computer system into a machine for:
   analyzing a compilation profile of a user of a mobile communications device;
   determining targeted content to target to the user based on the analysis of the compilation profile and available content; and
   providing the targeted content, which is determined based on the analysis of the compilation profile and available content, to a data processing system for serving to the mobile communications device and wherein:
   (i) the mobile communications device is separate from the computer system;
   (ii) the targeted content is obtained using the compilation profile of the user associated with the mobile communications device and is stored separate from the mobile communications device;
   (iii) the compilation profile is generated using data directed to the computer system from multiple data sources;
   (iv) the data is associated with the user;
   (v) the data includes passive data;
   (vi) the passive data includes data about the user received from two or more of the multiple data sources, at least one of the data sources of the passive data resides separate from the mobile communications device and the computer system, and at least one of the data sources is a data aggregator that does not engage in a direct communication session with an identifiable communication device of the user and the passive data received from the data aggregator is not collected from the direct communications session with the identifiable communication device of the user; and
   (vii) the passive data about the user is stored separate from the mobile communications device in a data structure configured for at least identifying the passive data about the user and for at least generating the compilation profile that includes the passive data about the user.

16. The method of claim 15 wherein the compilation profile includes non-behavioral data, non-contextual data, and at least two members of a group consisting of:
   i. data about the user including identification of a mobile application of the mobile communication device;
   ii. a request for advertising originating from a first application of the mobile communication device;
   iii. a request for advertising originating from a second application of the mobile communication device;
   iv. advertising preference information directly provided by the user of the mobile communication device to an advertising server system;
   v. behavioral data of the user; and
   vi. information inferred by analyzing any of the data in elements i-v.

17. The method of claim 15 wherein providing targeted content for serving to the mobile communications device further comprises:
   serving the targeted content directly to a targeted content provider.

18. The method of claim 15 wherein the targeted content comprises one or more advertisements.

* * * * *